United States Patent [19]
Wians et al.

[11] Patent Number: 6,085,502
[45] Date of Patent: Jul. 11, 2000

[54] BLADE BRAKE ASSEMBLY

[75] Inventors: Jeff A. Wians, Mebane, N.C.; Daniel J. Turk, Columbus, Ohio

[73] Assignee: Honda Giken Kogyo Kabushiki Kaisha, Tokyo, Japan

[21] Appl. No.: 09/107,421

[22] Filed: Jun. 30, 1998

[51] Int. Cl.[7] ............................ A01D 69/00; A01D 69/08
[52] U.S. Cl. ............................. 56/11.3; 56/11.4; 56/11.6; 56/11.8
[58] Field of Search .................... 56/11.3, 11.4, 56/11.6, 11.7, 11.8, 16.7; 188/220.6; 70/228

[56] References Cited

U.S. PATENT DOCUMENTS

| | | | |
|---|---|---|---|
| 4,037,668 | 7/1977 | Svejda | 172/371 |
| 4,058,957 | 11/1977 | Roseberry | 56/11.3 |
| 4,285,419 | 8/1981 | Anderson | 192/11 |
| 4,300,332 | 11/1981 | Jackson | 56/11.6 |
| 4,409,779 | 10/1983 | Bent et al. | 56/11.3 |
| 4,416,107 | 11/1983 | Hoff | 56/11.8 |
| 4,454,706 | 6/1984 | Geeck, III | 56/11.3 |
| 4,493,180 | 1/1985 | Wick | 56/11.3 |
| 4,518,047 | 5/1985 | Peterson et al. | 172/611 |
| 4,551,967 | 11/1985 | Murcko | 56/13.7 |
| 4,558,558 | 12/1985 | Horner, Jr. et al. | 56/11.3 |
| 4,813,215 | 3/1989 | Chase et al. | 56/11.6 |
| 4,878,339 | 11/1989 | Marier et al. | 56/14.7 |
| 5,014,791 | 5/1991 | Kure | 172/21 |
| 5,020,308 | 6/1991 | Braun et al. | 56/11.3 |
| 5,042,238 | 8/1991 | White, III et al. | 56/11.8 |
| 5,050,371 | 9/1991 | Tharman et al. | 56/10.5 |
| 5,127,215 | 7/1992 | Wenzel | 56/11.1 |
| 5,138,824 | 8/1992 | Oshima et al. | 56/10.2 |
| 5,146,735 | 9/1992 | McDonner | 56/11.3 |
| 5,343,678 | 9/1994 | Stuart | 56/11.3 |
| 5,488,818 | 2/1996 | Powers et al. | 56/11.4 |
| 5,680,903 | 10/1997 | Oliver | 172/22 |
| 5,692,366 | 12/1997 | Hardesty | 56/11.2 |

*Primary Examiner*—Eileen Dunn Lillis
*Assistant Examiner*—Raymond W Addie
*Attorney, Agent, or Firm*—Armstrong, Westerman, Hattori, McLeland & Naughton

[57] ABSTRACT

A blade brake assembly is provided for use with a lawn mower having a self-propelled power deck with a pair of drive wheels and a mower deck supporting at least a mower blade driven by the power deck. In order to change the cutting height, the mower deck is pivotable with respect to the power deck. The blade brake assembly includes an actuator mounted to the power deck and shiftable in response to a brake command by an operator, a band brake operatively coupled to the mower blade, a center pivot mounted on the mower deck and fixed with respect thereto, and a pivot lever pivotally mounted on the center pivot and having a first end pivotally connected to an end of the actuator. Furthermore, a link member is pivotally connected at one end thereof to a second end of the pivot lever, opposite the first end, wherein the center pivot is intermediate the two ends of the pivot lever, and wherein the link member is connected at the second end thereof to the band brake.

20 Claims, 16 Drawing Sheets

BLADE BRAKE ASSEMBLY

BACKGROUND OF THE INVENTION

1. Field of the Invention

The present invention relates to a blade brake for use in a walk-behind lawn mower, and more particularly for use in a self-propelled, walk-behind lawn mower. More specifically, this invention is directed to a blade brake assembly for use in a lawn mower having a lawn mower deck, including a mower blade, a power deck including a pair of drive wheels, and a motor, wherein the lawn mower deck is pivotable with respect to the power deck for changing the cutting height.

2. Description of the Related Art

Although the present invention has utility in walk-behind snow blowers, power sweepers or the like, the most common utilization of the invention is anticipated for lawn mowing equipment of the commercial type and particularly to large capacity, walk-behind, self-propelled mowers of the commercial type. Consequently, except where otherwise expressly stated, the description herein is directed to walk-behind lawn mowing equipment and in particular to commercial type lawn mowers.

Commercial type self-propelled, walk-behind lawn mowers commonly have a power deck containing two drive wheels and handle bars supporting operating handles for various control functions, including gear selection, power take-off engagement/disengagement, speed controls for each wheel, etc. The mower deck is supported by a structure having caster wheels and extending forward from the power deck.

In such mowers, a blade brake function, specified by ANSI requirements is often accomplished by attaching a band brake on a spindle of one of the mower blades. When the band brake is activated, the mower blade stops. If there are multiple mower blades, usually tied together with a belt, if one blade stops, then the remaining blades will also stop because the first blade has stopped. Such band brake may be activated when the power take-off unit is disengaged (or turned off). Usually the power take-off unit is disengaged by operating a lever. Often, such a lever will move an idler pulley operating on a belt transferring power between the motor and the mower deck, into a position where there is no longer tension on the belt, and thus no longer drive to the mower deck. When the power take-off lever causes such disengagement, an actuator operatively connected to the power take-off disengagement lever will then operate the band brake. Since the actuator is mounted on the power deck, which is stationary, and the band brake is mounted on the mower deck, which pivots, a problem arises with the band brake when raising or lowering the mower deck to different cutting height settings, when the actuator is connected directly to the band brake.

For example, if a mower deck is pivoted at a forward portion thereof, for movement up and down to change the cutting height, the actuator for actuating the band brake must somehow adjust for the movement of a mower deck in changing the cutting height.

Accordingly, there is difficulty in properly adjusting such a blade brake to accommodate maximum and minimum cutting height without requiring an accompanying adjustment of the blade brake. For example, if the blade brake is properly set for a high mower deck position, the brake may not disengage when the mower deck is pivoted to the low position. On the other hand, if it is set and adjusted for the low mower deck position, the brake may not engage when the mower deck is pivoted to a high position. Because the mower deck pivots while the engine and power deck remain stationary, in the high mower deck position the blade brake may actually be closer to the idler pulley, which is the point of actuation for the brake linkage. At the same time, the deck drive pulley may be closer to the engine pulley which makes the idler pulley rotate more. Thus, when the actuation of the blade brake occurs directly from the actuator for the idler pulley, the differences in height and distance to the blade brake will cause the problem described above.

SUMMARY OF THE INVENTION

The above described problems are substantially overcome by the instant invention. The linkage between the actuator, whose actuating point is near the idler pulley, and the band brake is no longer a single element, direct linkage. Specifically, an actuator rod extends to one end of a pivot lever, with the other end with a pivot lever engaging a linking member, whose remote end actuates the band brake. It is particularly advantageous for the pivot lever to be positioned near the front of the mower deck, and more specifically, near the pivot point where the mower deck pivots with respect to the power deck.

Thus, in accordance with the instant invention, a blade brake assembly may be used with a lawn mower having a self-propelled power deck with a pair of driving wheels, and a mower decks supporting at least a mower blade driven by the power deck, wherein the mower deck is pivotable with respect to the power deck in order to change the cutting height. The blade brake assembly includes an actuator, a band brake, a center pivot, a pivot lever and a link member. The actuator is mounted to the power deck and is shiftable in response to a brake command by an operator. The band brake is operatively coupled to the mower blade. The center pivot is mounted on the mower deck and fixed with respect thereto, while the pivot lever is pivotally mounted on the center pivot and has a first end pivotally connected to an end of the actuator. The link member is pivotally connected at one end thereof to a second end of the pivot lever, opposite the first end, wherein the center pivot is intermediate the two ends of the pivot lever. The link member is connected at a second end thereof to the band brake.

The blade brake assembly in accordance with the instant invention is able to minimize the effect of the pivoting movement of the mower deck with respect to the power deck. By employing a pivot lever and a two-part linkage, wherein the pivot lever is close to the mower deck's pivot point, the problem of the pivoting mower deck is solved.

Because of the structure described above, the instant invention has a proper clearance between the band brake and the drum, on which it operates, in all height positions, high and low. Furthermore, all necessary blade stop times are achievable in all height positions. Because the clearance is proper in all height positions, there is little or no adverse brake wear on the band brake. All the above is accomplished with the same initial setting.

Extra motion of the power take-off (PTO) idler pulley within the power take-off belt, which is caused by a reduced distance between the engine and the mower deck drive pulley, is reduced or canceled with the distance change between the PTO idler pulley and the pivot lever. Because of the length of the actuating rod, extending from near the PTO idler pulley, a large advantage is obtained. Specifically, since the actuating rod is pivoted in two directions at the pivot lever, a large angular motion which the actuating rod has the end nearest the PTO idler pulley, results in a very small movement near the pivot point with the pivot lever. The actuating rod has a connecting end which is pivotally engaged with an over-size opening (larger than the thickness of the connecting end) in the pivot lever. Because of this pivotal connection, the actuating rod is pivotable in two angular directions with respect to the pivot lever. Specifically, the actuating rod is pivotable in the same or in a parallel plane with respect to the pivot lever. The actuating rod is also pivotable in a plane outside of the plane of the pivot lever, and more desirably is pivotable in a plane substantially perpendicular to the plane of the pivot lever.

Because the actuating rod is pivotable in two different directions with respect to the pivot lever, the pivot lever may always remain fixed (except for pivotal movement in its own pivot plane) with respect to the band brake. Thus, the link member connecting the pivot lever to the band brake is always properly adjusted, and does not cause uneven wear on the band brake or remain engaged or disengaged when the cutting height is changed. Thus, the same geometry between the pivot lever and the link member and the band brake is substantially maintained.

It should also be noted that when the distance between the center pivot of the pivot lever and the pivot with the actuating arm is larger than the distance between the center pivot of the pivot lever and the pivotable connection with the link member, because of the lever geometry, any difference in the length of the reciprocating movement of the actuating rod (caused by a change in cutting height) is accordingly reduced in the movement of the link member.

DETAILED DESCRIPTION OF THE INVENTION

Figure 1:
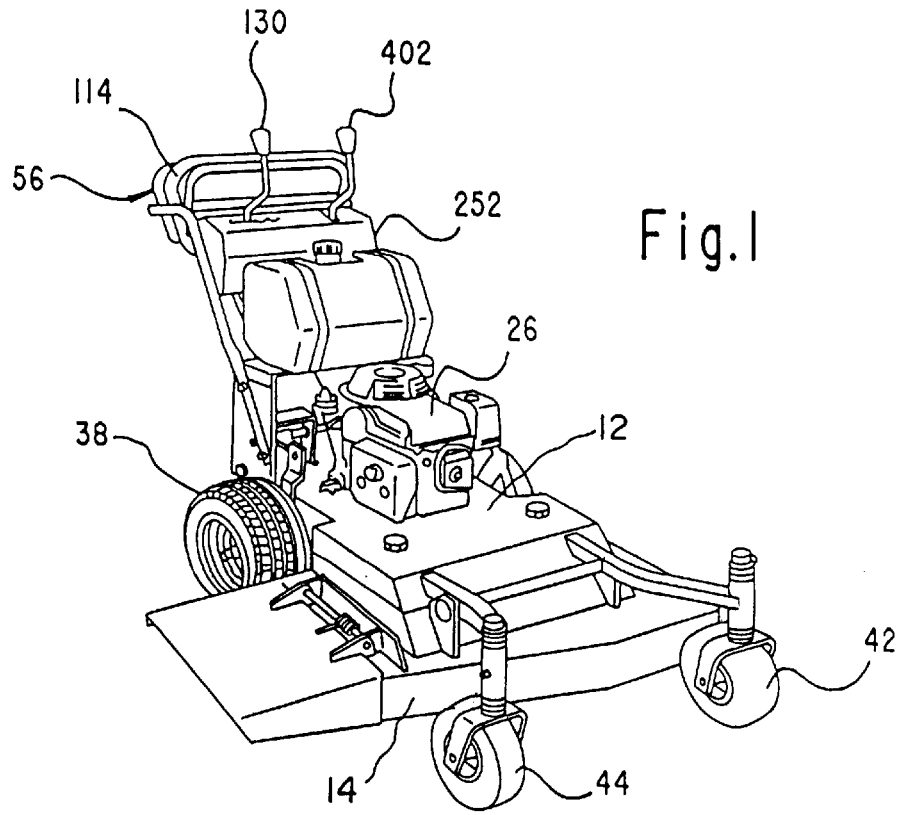
FIG. 1 is a front perspective view of a self-propelled, walk-behind form of lawn mower incorporating the present invention.

Although the present invention has application to power tools of various forms, such as snow blowers, power sweepers, or the like, the drawing figures illustrate an embodiment of the invention in which the operation element of the power tool is a lawn mower, particularly one employing multiple rotary blades as is common in large capacity, commercial forms of lawn mowing equipment. Also, although the disclosed lawn mower is described as being a "walk-behind" lawn mower, the concerned invention is equally applicable to power equipment attaching a "sulky" or a platform on which the operator may ride.

Figure 2:
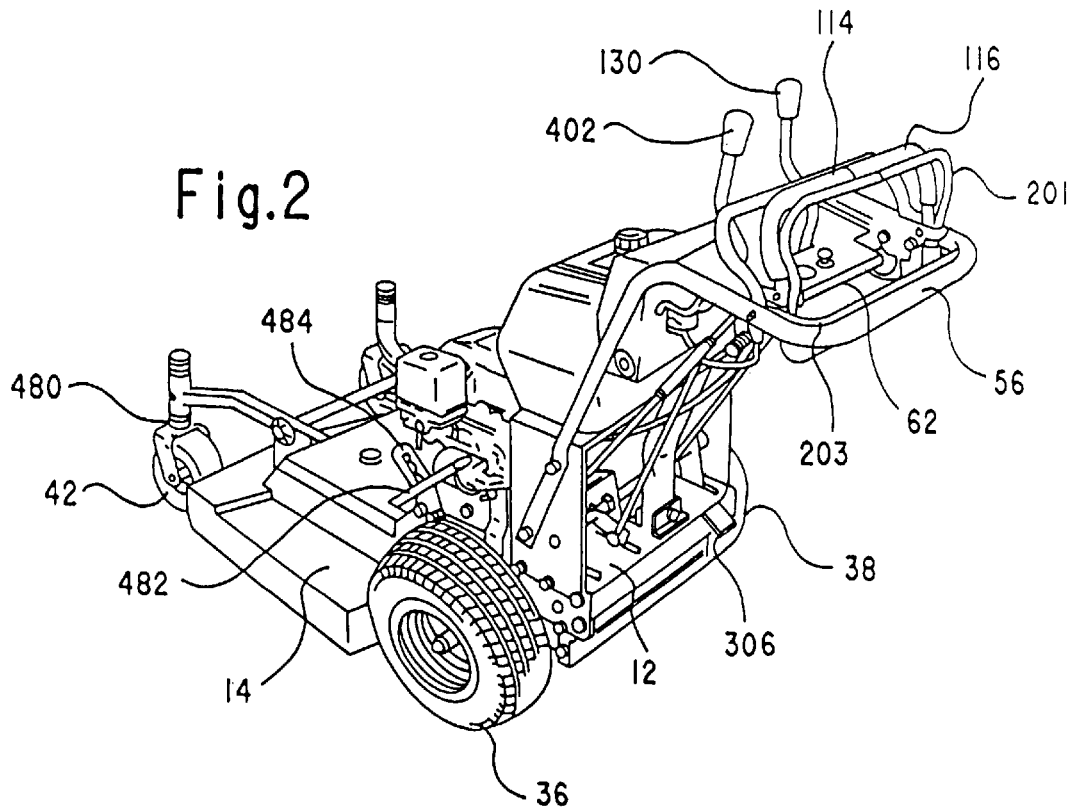
FIG. 2 is a rear perspective view of the lawn mower of FIG. 1.
Figure 3:
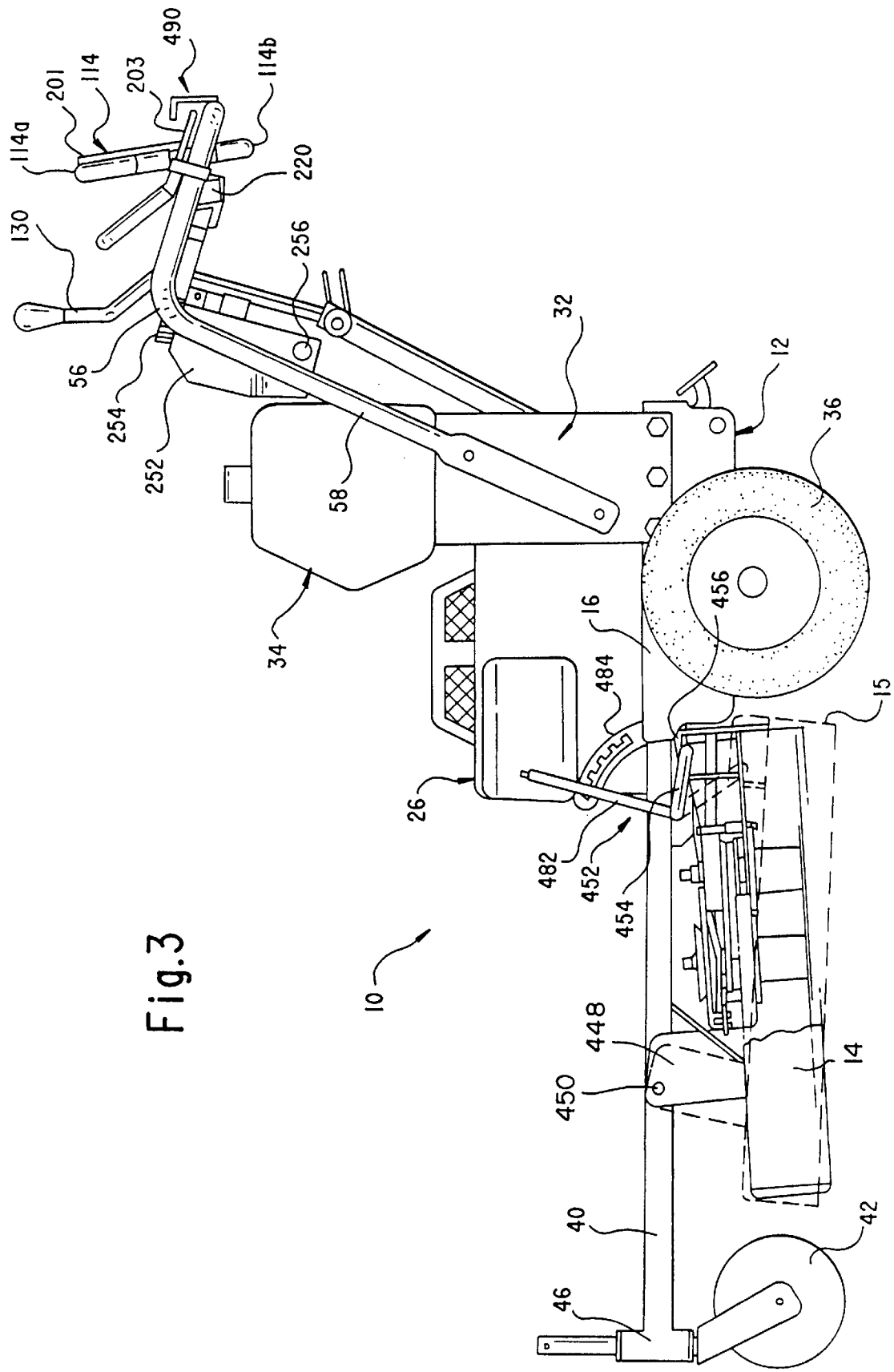
FIG. 3 is a side elevational view, partly in section, of the lawn mower illustrated in FIG. 1.

The described lawn mower 10, as best shown in FIGS. 1 to 3, contains a power deck 12 and a tool-or mowing-deck 14. Desirably, the mowing deck 14 is detachably connected to the power deck 12 to permit substituting for the mowing deck, either a snow blowing apparatus or a power sweeping apparatus, neither of which is shown herein.

The power deck 12 contains a bed 16 defined by a generally rectangular sheet metal plate 18 having down-turned flanges 20, 22 and 24 with flanges 20 and 22 being disposed along the laterally spaced sides of the bed, and flange 24 extending between, and interconnecting, the side flanges at the rear of the bed. An engine 26 is mounted on the upper surface of the bed 16 wherein a through-opening 28 is provided to accommodate passage of the engine drive shaft 30 to the underside of the bed plate 18. An inverted U-shaped bracket 32 has its down-turned legs 32a and 32b secured to the rear end of the bed 16 and its upwardly disposed platform portion mounting a fuel tank 34.

A pair of laterally spaced drive wheels, including left wheel 36 and right wheel 38, are disposed on opposite sides of the bed 16 in a manner hereinafter more fully described. Also, a pair of laterally spaced support arms 40 extend longitudinally forward from the bed 16 for attaching the mowing deck 14. The support arms 40 are fixedly secured at their respective rear ends to the bed and at their forward ends each mount left and right caster wheels 42 and 44, respectively, which are journalled for free rotation about a vertical axis by associated support shaft housings 460. As shown best in FIG. 3, the mowing deck 14 is mounted via laterally spaced brackets 448 carrying pivot pins 450 which pivotally engage the respective support arms 40 adjacent the forward ends thereof. A height adjusting mechanism 452 secures the rear end of the mowing deck 14 in a manner which permits height adjustment of the mowing deck.

Figure 4:
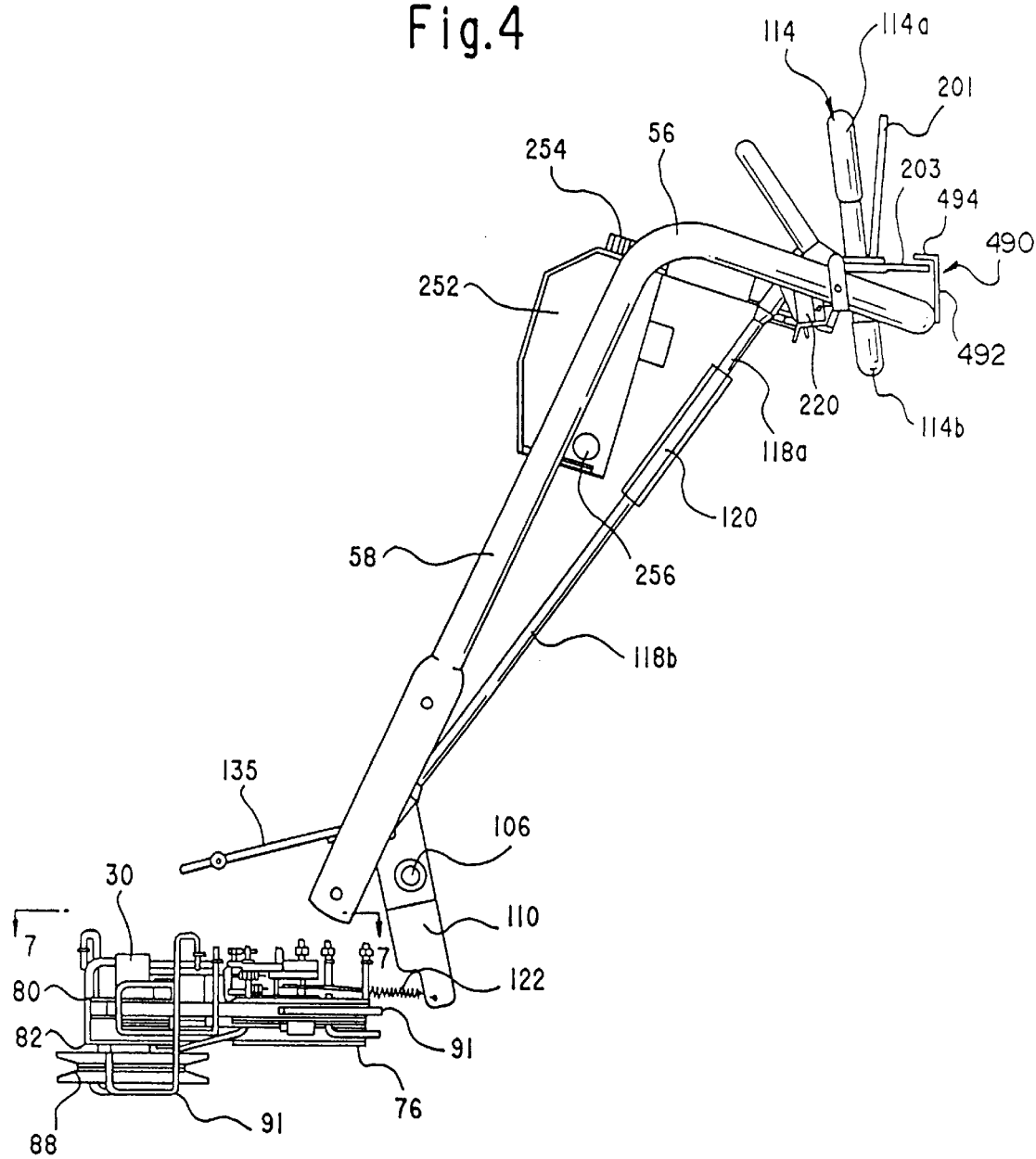
FIG. 4 is a partial side elevational view of the handle bar and control-operating handles mounted thereon employed on the mower of FIG. 1.
Figure 5:
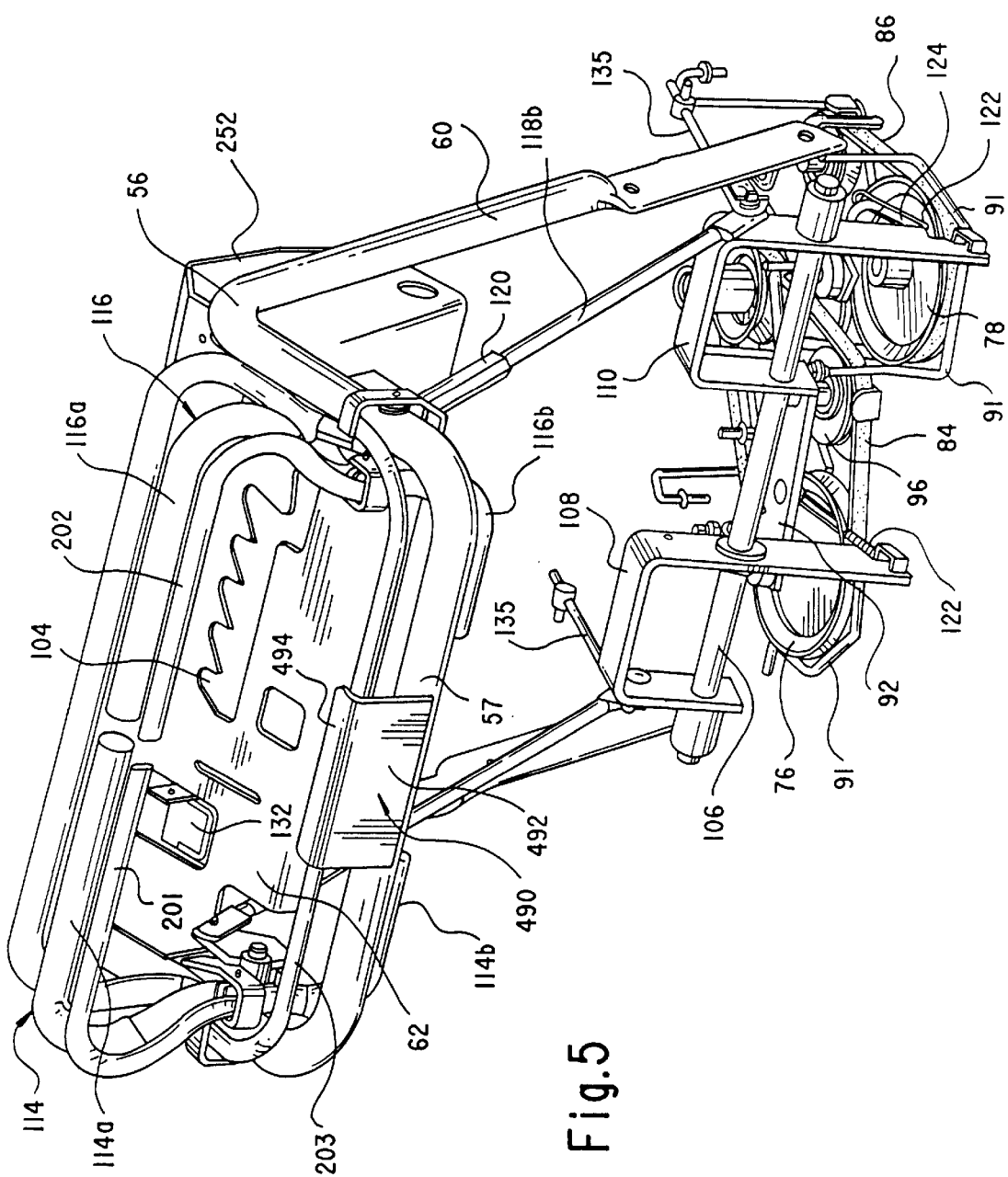
FIG. 5 is a partial perspective view illustrating in greater detail the control elements and the controlled element shown in FIG. 4.
Figure 6:
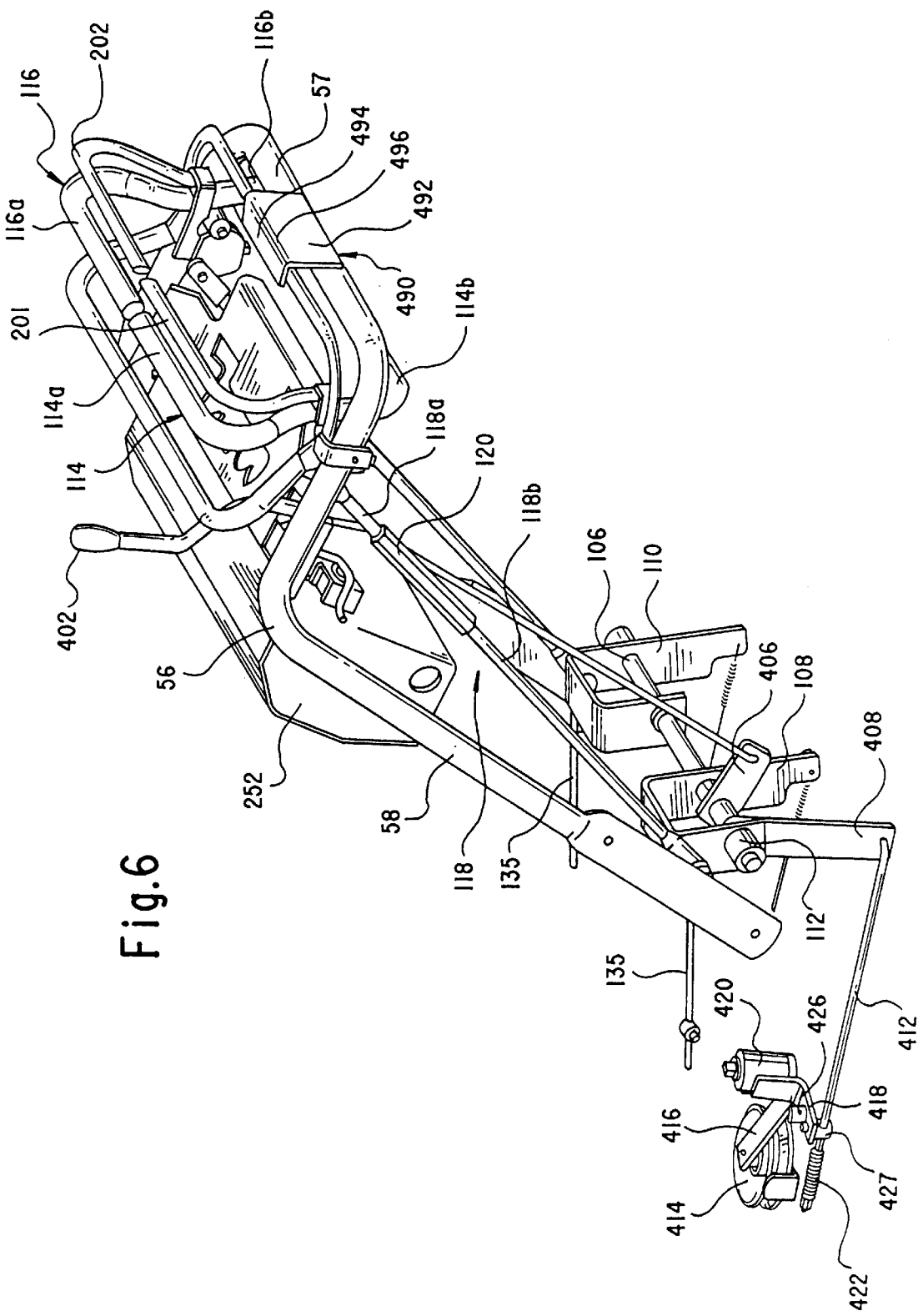
FIG. 6 is another partial perspective view of the control elements and the elements controlled thereby shown in FIG. 4.
Figure 7:
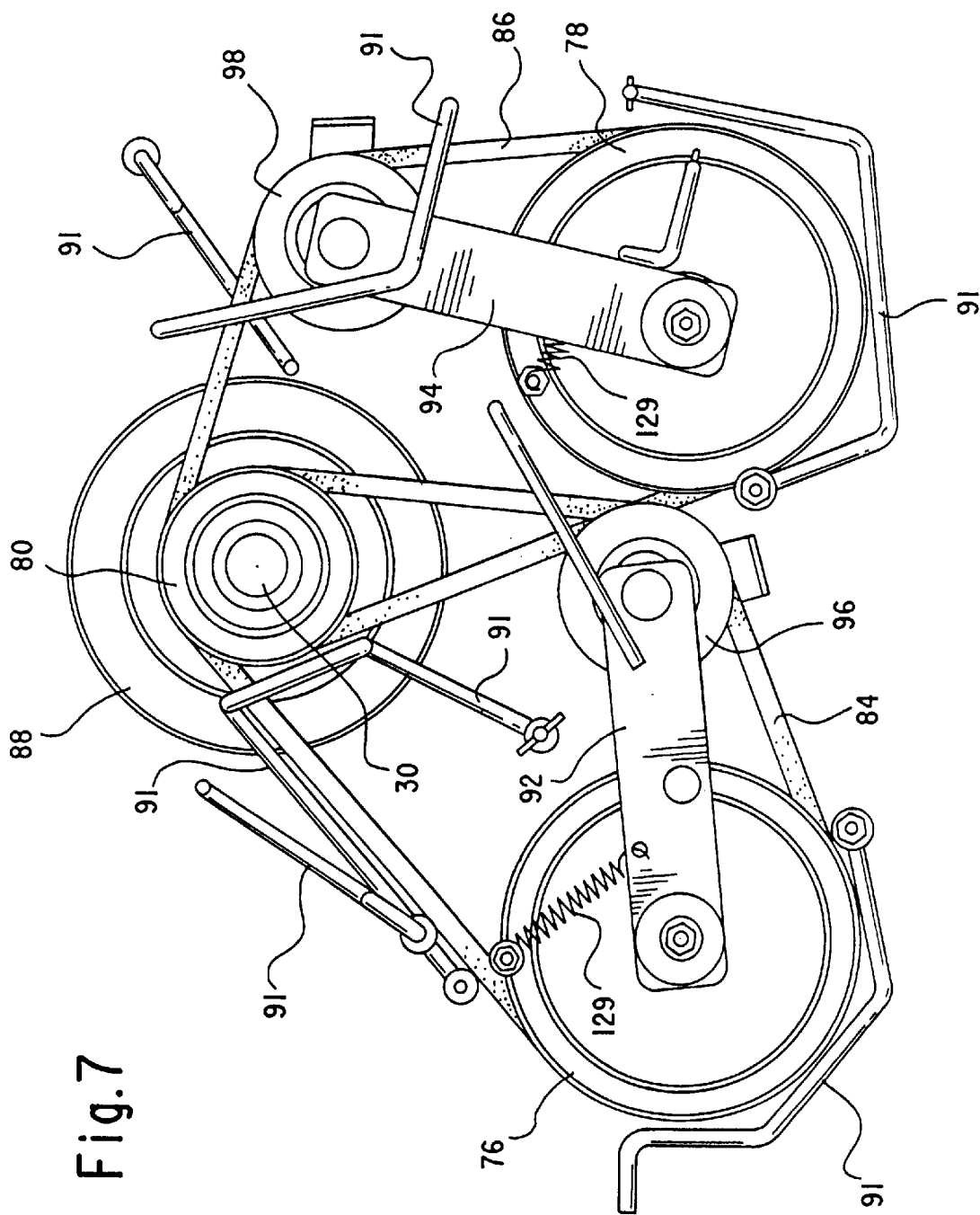
FIG. 7 is a view taken along line 7—7 of FIG. 4.
Figure 8:
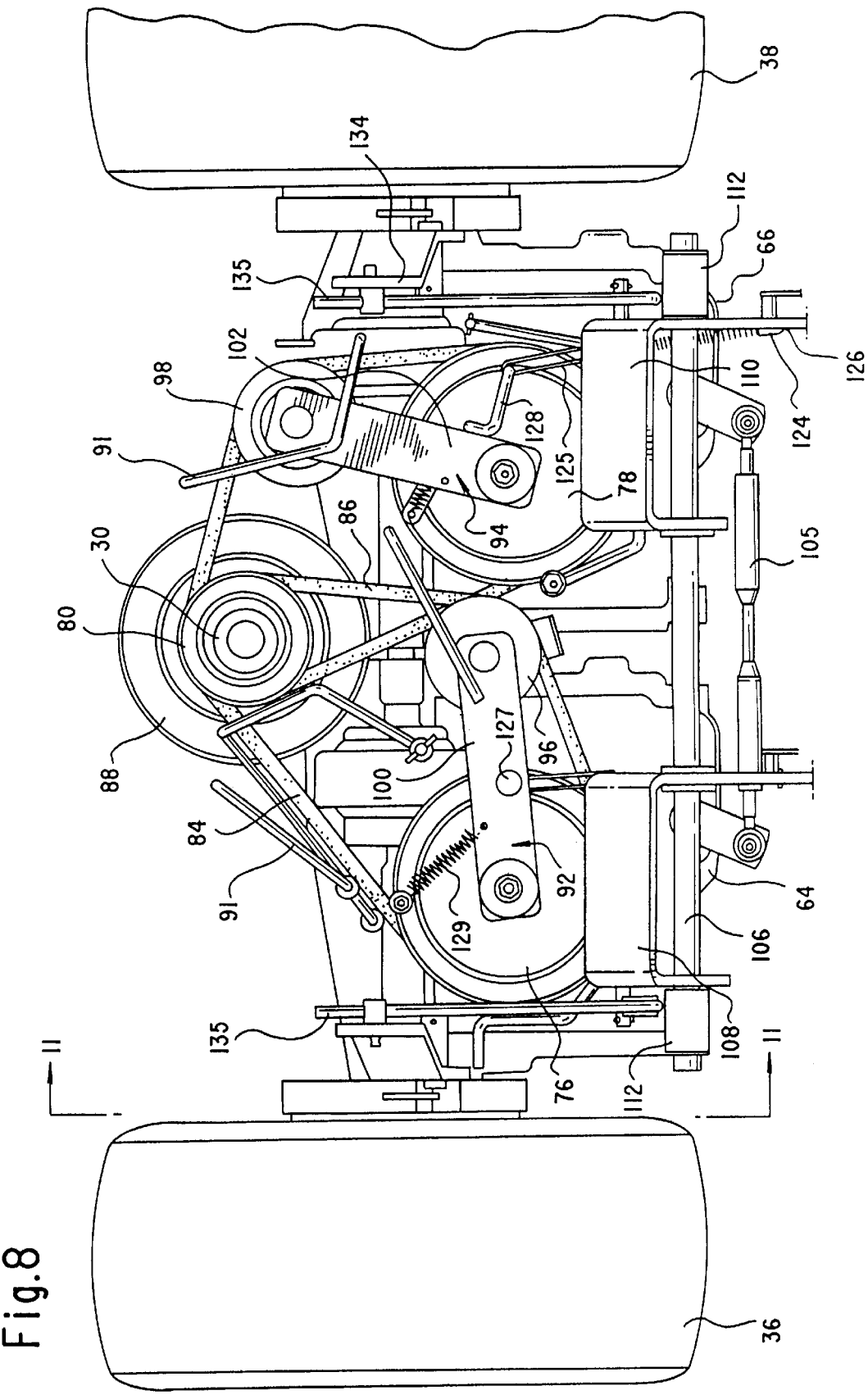
FIG. 8 is a plan view of the belt and pulley system employed for operating the drive wheels of the present invention.
Figure 9:
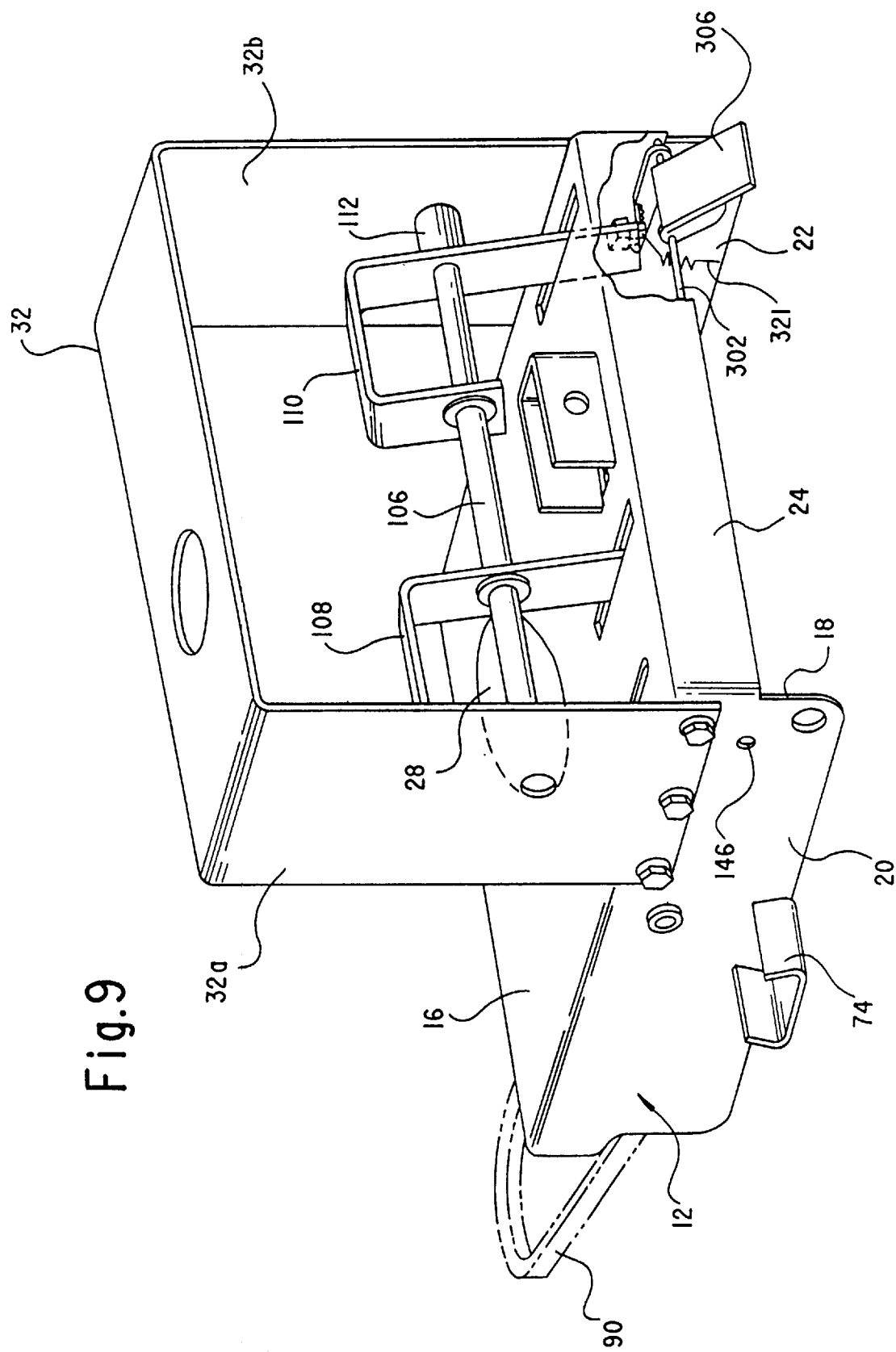
FIG. 9 is a partial perspective view of the power deck with drive levers and parking brake operator mounted thereon.
Figure 10:
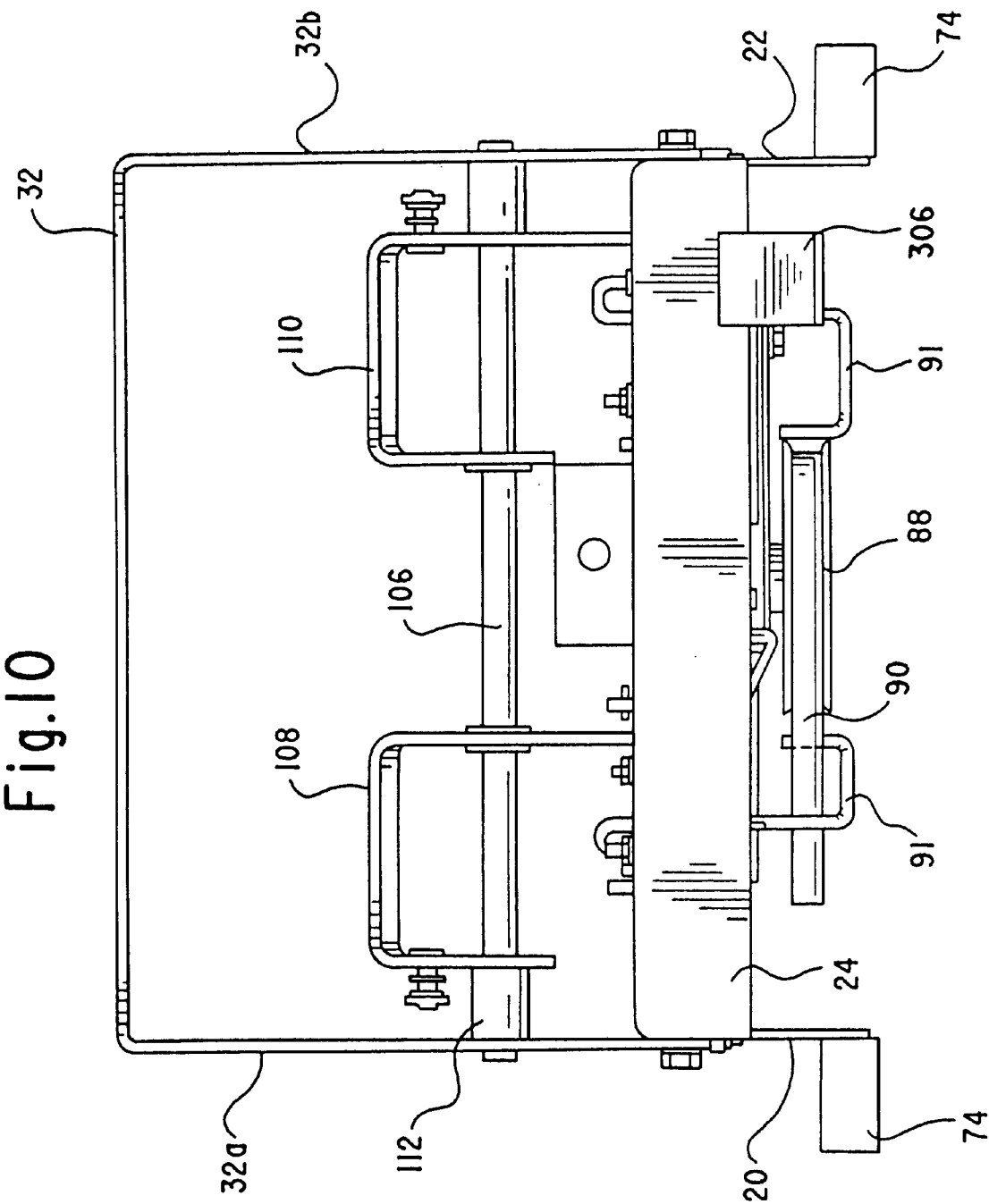
FIG. 10 is a rear view of the power deck and drive levers of FIG. 9.

As shown in FIGS. 4, 5 and 6, a handle bar 56 having a pair of left and right depending arms 58 and 60, respectively, is fixedly secured to the downturned legs of the bracket 32. A panel plate 62, that is substantially coextensive with the space along the handle bar 56 between the arms 58 and 60 provides access to control elements, as hereinafter are more fully described.

Drive Controls

With particular reference to FIGS. 3 to 11 of the drawings, lawn mower control apparatus is shown for controllably operating the left and right drive wheels 36 and 38. The control apparatus includes individual left and right gear-operated transmissions 64 and 66, respectively. The transmissions are mutually spaced laterally with respect to each other and each has a horizontally extending output shaft (not shown) extending in opposite directions away from each other with each output shaft being adapted to mount a hub of one of the drive wheels 36, 38. The transmissions are structurally interconnected on their respective facing ends by means of appropriate connecting structure (not shown) and are fixedly secured to the bed 16 of the power deck 12 by means of connectors (not shown) that attach posts which surround an output shaft bearing bushing 72 to laterally extending support ears 74 fixedly secured to the respective side flanges 20 and 22 of the power deck bed 16. Power input to each transmission 64, 66 is effected by a belt-driven input pulley, indicated as 76 on the left transmission 64 and as 78 on the right transmission 66. Each pulley 76 and 78 is fixed to and rotatably drives input shafts on the respective transmissions 64, 68 and extends substantially parallel to the engine drive shaft 30.

As indicated in FIGS. 4, 5, 7 and 8 of the drawings, the engine drive shaft 30, which rotates about a vertical axis, mounts a pair of vertically spaced pulleys 80, 82, about the respective ones of which the drive belts 84, 86 extend. Drive belt 84 extends between the uppermost pulley 80 on the engine drive shaft 30 and the pulley 76 on the input shaft to the left transmission 64. Drive belt 86 extends between the next lower pulley 82 on the engine drive shaft 30 and the pulley 78 on the input shaft to the right transmission 66. As shown, the input pulley 76 on the left transmission 64 is disposed slightly higher than pulley 78 on the right transmission and substantially level with the pulley 80 on the engine drive shaft 30. Similarly, the input pulley 78 on the right transmission 66 is disposed substantially level with the pulley 82 on the engine drive shaft whereby the drive belts 84 and 86 each operate in substantially level, horizontal planes.

A third pulley, termed "the power take-off (PTO) pulley," 88 is disposed at the lower end of the engine drive shaft 30 and is engaged by a drive belt 90 employed to rotatably drive the mower blades, as described hereinafter.

Belt guards, in the form of rod members 91 attached at one of their ends to the bed 16, have offset portions positioned closely adjacent the various belts and serve to prevent the respective belts from becoming dislodged from the pulleys which they engage.

Power input to the respective drive wheel transmissions is individually controllable by means of clutch element 92, 94 which are each in the form of idler pulleys 96, 98 that rotate on one end of pivotable lever arms 100, 102, respectively, whose opposite ends are pivotally secured to the undersurface of the metal bed plate 18. As shown best in FIG. 7, the lever arms 100, 102 which carry the respective idler pulleys 96, 98 are each disposed within the space surrounded by the drive belt with which each is associated. Return springs 129 which have one end connected to the bed 16 and the other end connecting each lever arm 100, 102 serve to normally bias the idler pulleys 96, 98 away from their respective drive belts 84, 86. Also, appropriate limit stops (not shown) extend from the bed plate 18 and serve to limit the angular displacements of the lever arms 100, 102 when they are pulled into disengagement by the return springs 129.

Each of the wheel drive transmissions 64 and 66 is a multi-speed geared transmission which produces discrete selected speeds that the panel plate 62 indicates by notches 104 as best shown in FIG. 5, and include four forward speeds, a reverse speed and a neutral position. A tandem controlled transmission shifting device 105 (FIG. 8) is operative to jointly change the gear of the respective transmissions 64, 66. Geared transmissions, suitable for use in the practice of the invention, are those made by Dana Corp. under Model No. 4360-102.

Separate control members operate the clutch elements in order to vary torque transmission between the output of the engine drive shaft 30 and the input to the respective left and right drive transmissions 64, 66. Thus, as shown in the drawings, the bracket 32 on the power deck 12 mounts a support shaft 106 which extends between, and is fixed at its ends, to the respective legs 32a and 32b of the bracket. Drive levers 108 and 110 having the general shape of an inverted J and disposed at axially spaced locations along the shaft 106 contain clearance openings in the legs of the levers which enable the levers to undergo controlled pivoted movement about the shaft. Spacers 112 serve to separate the drive levers 108, 110 from the respective legs 32a, 32b of the bracket 32. Each of the drive levers 108, 110 is independently operated by a respective one of a pair of control handles 114, 116 which are disposed for pivotal movement on the handle bar 56 and that contain transversely extending upper portions to facilitate manual manipulation by the machine operator. A connecting rod 118 extends between and connects the respective control handles 114, 116 to each drive lever 108, 110. Axial adjustment of the respective connecting rods with respect to their associated drive lever can be effected by a turnbuckle 120 which connects an upper portion 118a to a lower portion 118b of each connecting rod.

Each drive lever 108, 110 attaches at a depending leg portion a drive spring 122 which extends forwardly from the drive lever and is generally axially stiff. The springs 122 have at one end a hook 124 that engages an opening 126 in the depending leg of the drive lever 108 and 110. The other end of each spring 122 contains an elongated loop 125 forming a lost motion space and that, with regard to the left idler pulley 96, engages a pin 127 which depends from the underside of the lever arm 100. With regard to the right idler pulley 98, and in order to accommodate the unequal vertical spacing between the drive belts 84 and 86, the looped end 125 of the associated spring 122 engages the lower end of bent pin 128 whose upper end is fixed, as by means of welding, or the like, to the edge of the right idler pulley lever arm 102.

Thus, operation of the mower in the forward direction involves, first, the transmissions 64 and 66 associated with the respective wheels 36 and 38 being placed by the operator in a selected drive range, as determined by placement of the shift lever 130 in an appropriate notch 104 in the panel plate 62. To propel the mower straight forwardly both upper control handles 114a and 116a are simultaneously moved forwardly whereupon the drive levers 108 and 110 are pivoted about the support shaft 106 in a direction to extend the drive springs 122 rearwardly which causes the lever arms 100 and 102 carrying the idler pulleys 96 and 99 to be controllably urged into engagement with the respective drive belts 84 and 86 thereby adjusting the tension of the respective drive belts about the pulleys they engage. Such adjustment alters the torque transmission from the engine drive shaft 30 to the left and right transmissions 64 and 66, respectively, within the selected gear range. To steer the mower 10, the operator need only push or pull one control handle with respect to the other whereupon the driving force to one drive wheel with respect to the other is altered thereby causing the course of the machine to be altered.

Reverse propulsion of the mower 10 is accomplished by, first, moving the shift lever 130 to the reverse position in the notches 104. Then, the lower control levers 114b and 116b of the control handles 114 and 116 are pulled rearwardly. This rearward motion of the lower control handles 114b and 116b has the same effect as the forward motion of the upper control handles 114a and 116a. The mower 10 may be steered in reverse in the same manner as the forward driving.

Figure 11:
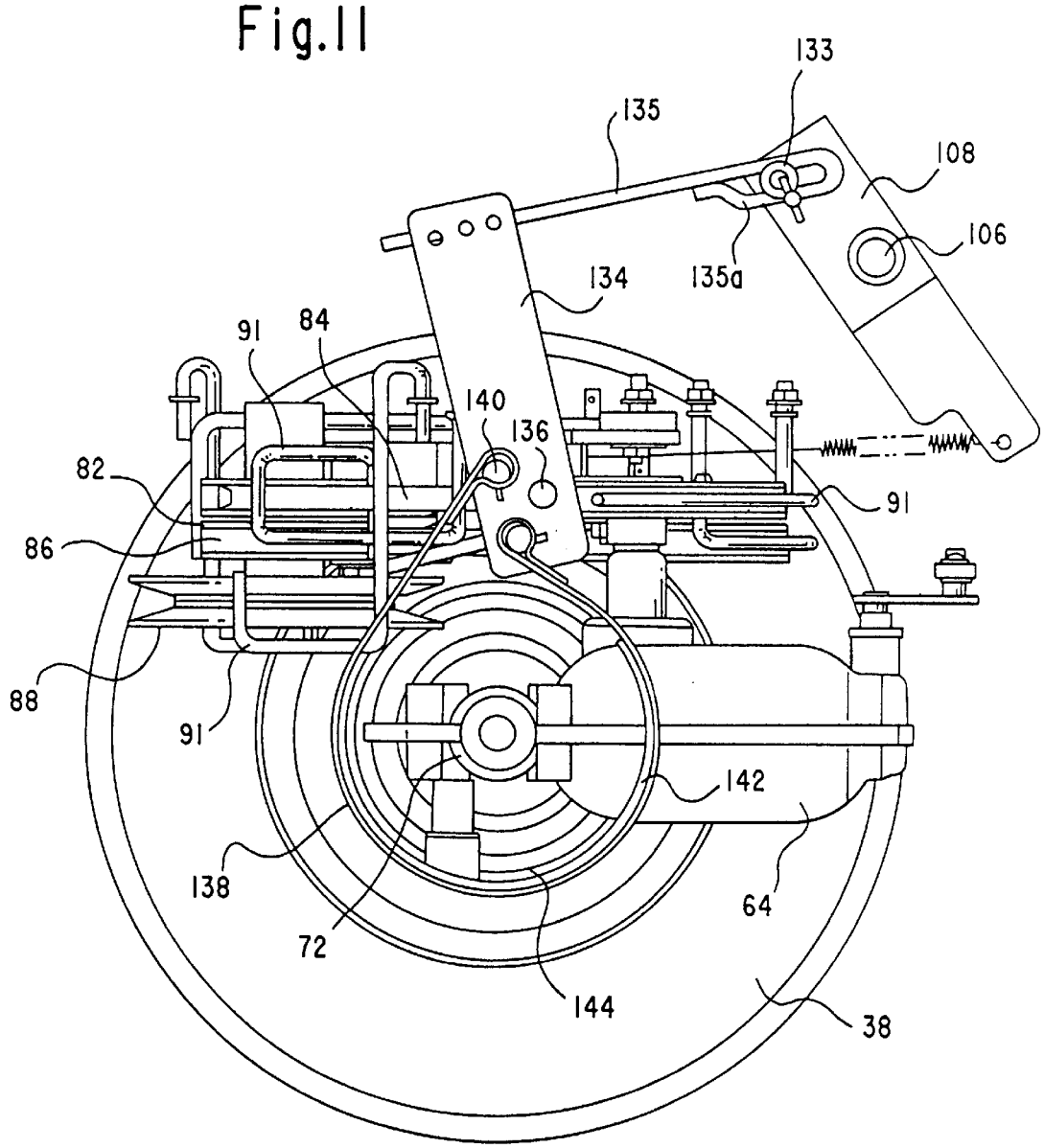
FIG. 11 is a partial elevational view with portions removed taken along line 11—11 of FIG. 8.

Braking of the respective drive wheels 36 and 38 in order to stop forward movement of the machine, or to augment its turning movements, is effected by the operator pivotally moving one or the other, or both of the control handles 114 and 116 in a direction opposite to that required for effecting rotation of the drive wheels 36, 38 for forward movement. Thus, to brake the left drive wheel 36, for example, the control handle 114 which controls operation of the left drive wheel is pivoted, either by pulling its upper control handle 114a backwardly or by pushing its lower control handle 114b forwardly. By imparting such movement to the control handle 114, the connecting rod 118, which interconnects the left control handle 114 with the left drive lever 108, causes the drive lever 108 to rotate in a clockwise direction, as viewed in FIG. 11, whereupon the left brake lever 134 which connects to the drive lever 108 via connecting link 135 is pivoted in a clockwise direction about pivot pin 136 to cause brake band 138 whose ends connect with the brake lever via pin connectors 140 to constrict the brake pad 142 about the brake drum 144 on the wheel. Note that the brake drum 144 for the left wheel 36 has been omitted for clarity and that FIG. 11 shows only the brake drum 144 that is connected to the right wheel 38.

The connecting link 135 includes an elongated loop 135a that forms a lost motion coupling with the drive levers 108 and 110. This loop 135a allows the drive levers 108 and 110 to rotate counterclockwise (as viewed in FIG. 11) to engage the idler pulleys 96 and 98 with their respective drive belts 84 and 86 without imparting further motion onto the brake levers 134 which would cause further separation of the brake bands 138 from the brake drums 144

The simultaneous braking of both drive wheels 36 and 38 is effected by performing the above-described operation simultaneously on both control handles 114 and 116. Alternatively, in order to augment turning of the machine, one of the drive wheels can be substantially fully, or only partially, braked while the other drive wheel continues to be driven forwardly so as to effect a tight turn.

It will be appreciated that the power tool drive apparatus described herein, utilizing gear-operated drive transmissions, produces operating characteristics and features which heretofore were unique to equipment employing hydrostatic transmissions for transmitting engine power to the drive wheels. The disclosed arrangement provides a compactness of form which enables all of the components, which define the drive train, to be enclosed by the power deck bed, thus to protect the drive train components against damage occurring from the components contacting tree limbs or other vegetation, or the like. Conversely, by enclosing the drive train components, the machine operator and others who might come in close proximity to the machine are protected against injury caused by contact with moving drive train components.

These and other advantages previously attributable to hydrostatic transmissions are effectively obtained from gear-operated transmissions by practice of the invention wherein the clutching function, that is required for the use of gear-operated transmissions, is effected by the engagement of idler wheels on the drive belts, which engagement occurs on belts that transmit drive torque from the engine to the input to the transmission instead of to the output of the transmission as has been the practice of the prior art. As a result, because the clutching function is imposed on drive belts subjected to high speed but low torque, as contrasted with the converse, which prevails with prior art belt driven machines of the concerned type, undue wear caused by belt slippage is avoided. Therefore, the frequency of belt replacement, with its attendant inoperability of the machine, is significantly reduced.

Undue stressing of drive belts utilized in the described machine is further reduced by the fact that the idler pulleys are caused to engage the associated belts on the inside surface of the belts, i.e., the same surface as is engaged by the driving and driven pulleys of the system. Thus, compressive stresses are continuously imposed upon the inside belt surface while the outside belt surface is continuously stressed in tension. These continuous stress conditions are contrasted with prior art devices wherein, due to the idler pulley engaging the concerned belts on the side opposite that engaged by the drive and driven pulleys, the belts undergo the alternate imposition of compression and tension stressing which results in increases in belt fatigue and rapid belt wear.

Safety Cut-off System

The safety cut-off system in accordance with the instant invention will be described in connection with the figures set forth below.

FIGS. 1–6 illustrate the overall view of the mower including the arrangement of the handle bar controls. As illustrated in FIGS. 4–6, left forward presence lever 201 and right forward presence lever 202 are disposed near left upper control handle 114a and right upper control handle 116a. Furthermore, the generally elongated shape of left forward presence lever 201 and right forward presence lever 202 generally follows the elongated shape of upper left control handle 114a and upper right control handle 116a. Furthermore, as noted in FIGS. 5 and 6, the generally elongated shape of reverse presence lever 203 is similar to the elongated shape of the generally horizontal end portion 57 of handle bar 56. As seen in FIGS. 3 and 4, in profile, left forward presence lever 201, right forward presence lever 202 and reverse presence lever 203 are generally flat so that they may be easily be grasped together with another bar. Left forward presence lever 201 is easily grasped together with left upper control handle 114a, while right forward presence lever 202 is conveniently grasped together with upper right control handle 116a. Accordingly, reverse presence lever 203 is conveniently grasped together with horizontal end portion 57 of handle bar 56, in addition to lower control levers (or reverse control levers) 114b and 116b.

Figure 14:
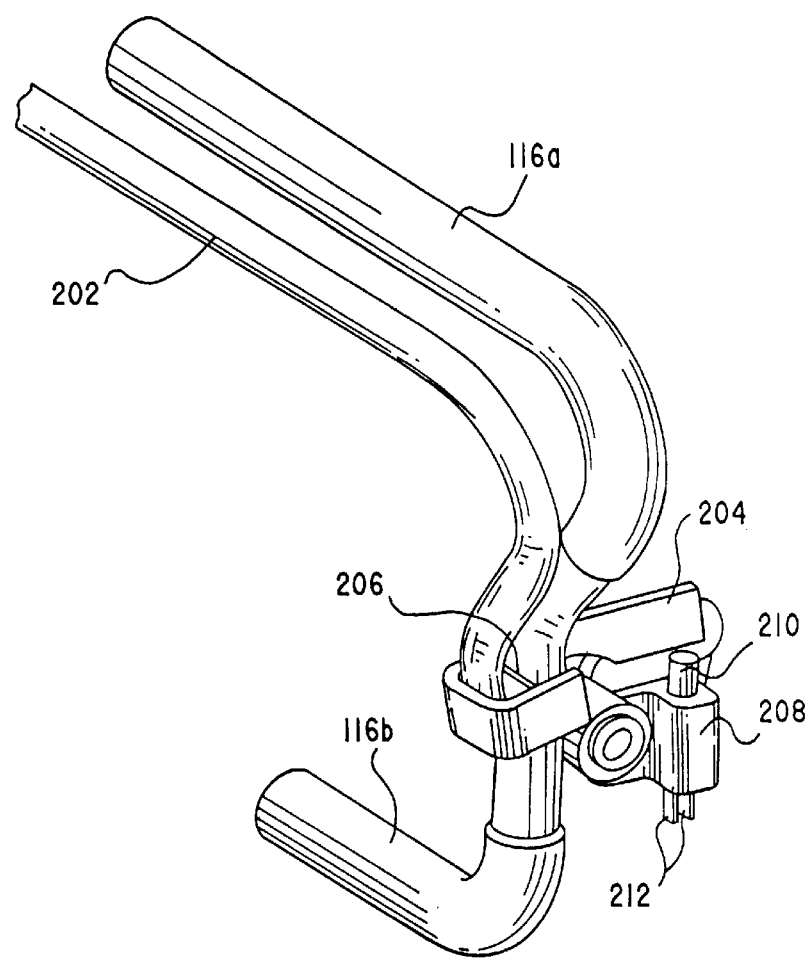
FIG. 14 is a partial perspective view of the operating handle and presence lever for forward operation of the drive wheel on the right side of the lawn mower shown in FIG. 1.

FIG. 14 is a partial perspective view isolating right forward presence lever 202 along with its corresponding upper right control handle 116a and lower right control handle 116b. Specifically, as noted, right forward presence lever 202 generally follows the shape of upper right control handle 116a. Accordingly, wherever it is possible to grasp upper right control handle 116a, right forward presence lever 202 is also easily grasped at the same time. Because the control handle 116 is pivotable with respect to handle bar 56 through a relative large angle, right forward presence lever 202 is pivotably mounted directly to the right control handle 116. In fact, since right forward presence lever 202 pivots with respect to right control handle 116, it is always near to upper right control handle 116a, no matter how little or how far upper right control handle 116a is pivoted. Normally open, right forward sensor switch 208 is fixed with respect to right control handle 116. Furthermore, a switch arm 204 extends generally forwardly from right forward presence lever 202 and is fixed with respect thereto. A spring 206 is provided between right forward presence lever 202 and upper right control handle 116a, such that right forward presence lever 202 is biased in the OFF state (disengaged state) and thus switch arm 204 is not engaged with plunger 210. When right forward presence lever 202 is grasped together with upper right control handle 116a, that is, the right forward presence lever 202 is now in the ON state (engaged state) switch arm 204 accordingly pivots and presses down plunger 210 of switch 208. This action causes switch 208 (which is a normally open switch) to be closed and thus to conduct electrical current between contacts 212, to which control wires are connected. The arrangement of the left forward presence lever with respect to the left control handle 114 is substantially a mirror image of the right forward presence lever 202 and right control handle 116, illustrated in FIG. 14. FIG. 3 illustrates left forward presence lever switch 220 which is opposite the right forward presence lever sensor switch 208.

Figure 15:
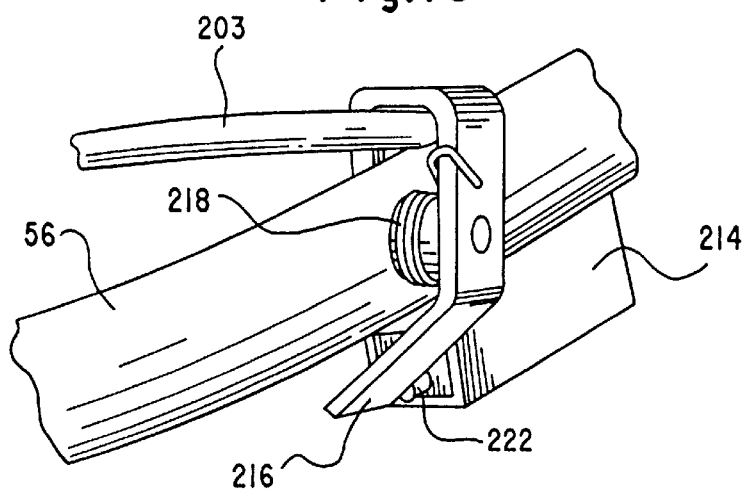
FIG. 15 is a view similar to FIG. 13 showing the operating handle and presence lever for reverse operation of the drive wheel on the right side of the lawn mower shown in FIG. 1.

FIG. 15 illustrates the relationship between the reverse presence lever 203 and handle bar 56. Handle bar 56 is fixed with respect to the mower. Also, as seen in FIGS. 5 and 6, the generally horizontal end portion 57 of handle bar 56 is generally parallel with reverse presence lever 203. Reverse presence lever 203 is pivoted with respect to handle bar 56. When reverse presence lever 203 is grasped together with horizontal end portion 57 of handle bar 56, reverse presence lever 203 is substantially adjacent horizontal end portion 57 of handle bar 56. A reverse presence lever switch arm 216 extends downwardly from reverse presence lever 203 and is adaptable to engage plunger 222 of reverse presence lever sensor switch 214. When reverse presence lever 203 is in the OFF state, it is biased away from horizontal end portion 57 of handle bar 56 by spring 218. Reverse presence lever sensor switch 214 is a normally open switch. Thus, when reverse presence lever 203 is in the OFF state (disengaged state) reverse presence lever sensor switch 214 is maintained open. When the reverse presence lever 203 is grasped together with horizontal end portion 57 of handle bar 56, switch arm 216 is pivoted to contact plunger 222 and accordingly to close sensor switch 220.

Figure 16:
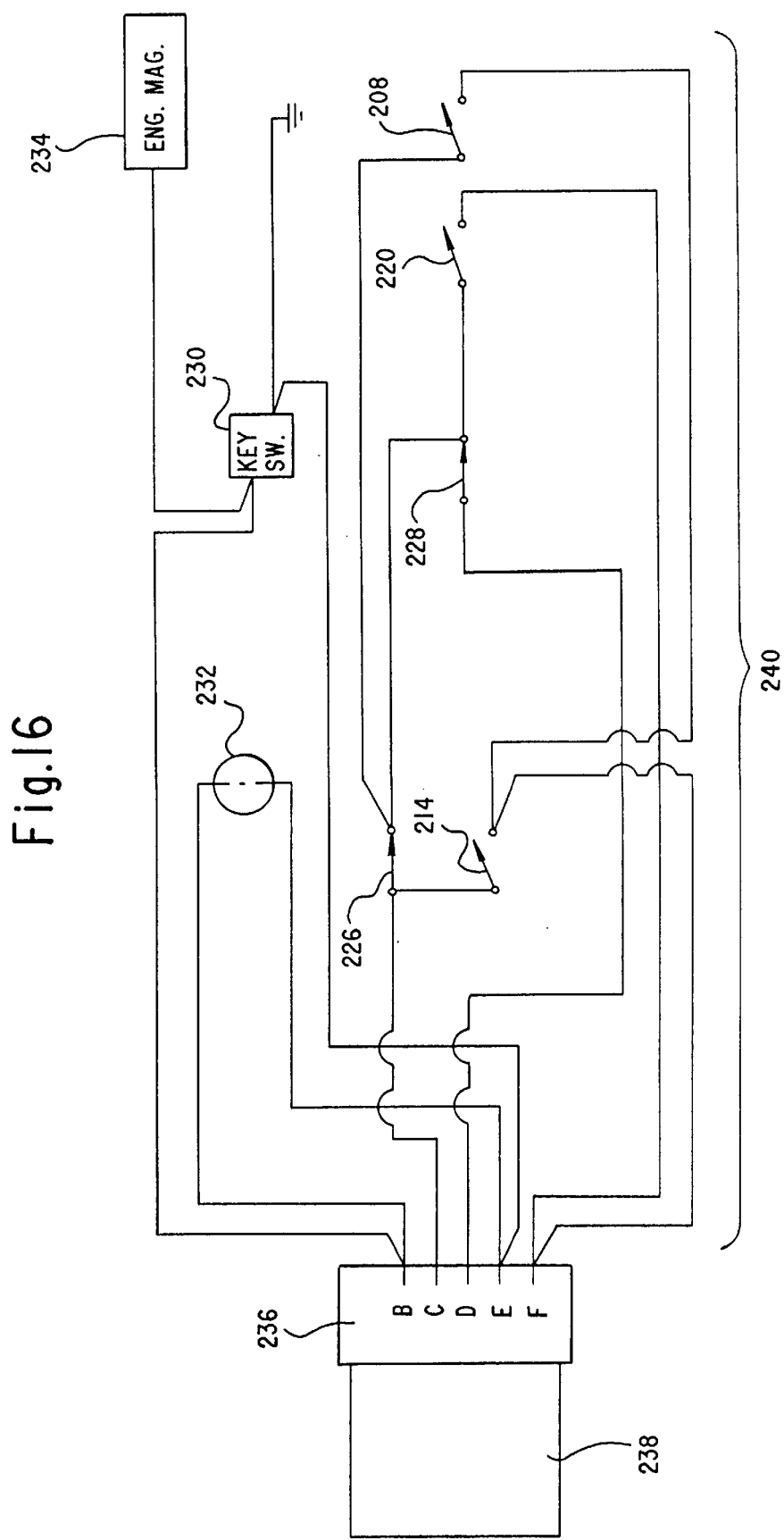
FIG. 16 is a schematic representation of the control circuitry for the lawn mower of the present invention.

FIG. 16 is a schematic diagram of the control circuit layout for controlling the safety cut-off system in response to the operation of the presence levers and control levers. Reference numeral 240 generally refers to the circuit for controlling the safety cut-off system. Circuit 240 is connected to connection block 236 with labeled connections B–F. Connection block 236 is in turn connected to switching module 238, which is available from Alphabet Wire Harness as Model No. 135331. Of course, module 238 may be any type of a switching module with relays, switches, electronic switches, a programmed logic array, or any other appropriate switching device.

Engine magneto 234 is connected to key switch 230 and is also connected to contact B. Key switch 230 is normally open when the engine is running. The opposite side of key switch 230 is connected to ground, thus when key switch 230 is closed, the engine magneto is grounded and the mower is prevented from running. On the side of key switch 230, opposite the engine magneto, key switch 230 is also connected to contact E. An hour meter 232 is connected between contact points B and E. Contact point C is connected to a front side of reverse gear sensor switch 226 (normally closed) and to the front side of reverse presence lever sensor switch 214. The back side of reverse gear sensor switch 226 is connected to a first lead of left forward presence lever sensor switch 220 and in parallel to a first lead of right forward presence lever sensor switch 208. The first lead of left forward presence lever sensor 220 is also connected to a first lead of power take-off sensor switch 228 (normally closed). The second lead of power take-off sensor switch 228 is connected to contact D. The second lead of left forward presence lever sensor switch 220 is connected to contact F. The second lead of right forward presence lever sensor switch 208 is connected to a second lead of reverse presence lever sensor switch 214 and to contact F.

During operation, in its most basic sense, one or both of the forward presence levers 201, 202 are pushed forward (into the ON state) when the lawn mower is neutral or forward gear, and while pushing forward on the upper control handles 114, 116. When the lawn mower is in reverse gear, the reverse presence lever 203 is depressed onto the horizontal end portion 57 of handle bar 56, while pulling backward on lower control handles 114b, 114b. Module 238 functions to connect contact E (at ground potential) to contact B to provide a ground level signal to the engine magneto and thus prevent the motor from running. When contact C is connected to contact D or F, then the connection between contact B and contact E is broken, and thus contact B is no longer at ground potential, therefore enabling the motor to run.

As noted, reverse gear sensor switch 226 is normally closed. This means that when reverse is gear engaged, switch 226 becomes open. When switch 226 becomes open, the only way for contact C to conduct to contact F is through reverse presence lever sensor switch 214. In order words, the only way to prevent cutting-off of the motor is to engage (put into the ON state) the rear presence lever 203. Thus, if the gear shift is in the reverse gear, irrespective of the status of right forward presence lever switch 208, left forward presence lever switch 220 and power take-off sensor switch 228, the reverse presence lever sensor switch 214 must be closed in order to prevent a cut-off of the motor.

When the lawn mower is in neutral or a forward gear, reverse gear sensor switch 226 is closed. Accordingly, any one of reverse presence lever sensor switch 215, left forward sensor switch 220, or right forward sensor switch 208 may be closed (either of the two forward presence levers or the reverse presence levers in the ON state) in order to prevent contact B (and thus the engine magneto) from being grounded.

Power take-off lever sensor switch 228 is normally closed. That is, when the power take-off unit is engaged, the switch is open, and when the power take-off unit is disengaged then switch 228 is closed.

A clear view of how the schematic diagram of FIG. 16 works can be seen with reference to the following table A.

TABLE A

| No. | Gear | PTO | Right Fwd PL | Left Fwd PL | Rev PL | Engine |
|---|---|---|---|---|---|---|
| 1 | N-4 | ON | OFF | OFF | OFF | OFF |
| 2 | N-4 | ON | ON (OFF) | OFF (ON) | OFF (ON) | ON |
| 3 | N-4 | OFF | OFF (ON) | OFF (ON) | OFF (ON) | ON |
| 4 | R | OFF | OFF | OFF | OFF | OFF |
| 5 | R | OFF | ON (OFF) | OFF (ON) | OFF | OFF |
| 6 | R | OFF | OFF (ON) | OFF (ON) | ON | ON |
| 7 | R | ON | OFF | OFF | OFF | OFF |
| 8 | R | ON | ON (OFF) | OFF (ON) | OFF | OFF |
| 9 | R | ON | OFF | OFF | ON | ON |

As can be seen from Table A, the different status of the right forward presence lever, the left forward presence lever and the reverse presence lever affect the engine depending on which gear is selected and whether the power take-off unit (PTO) is engaged (ON) or disengaged (OFF). Specifically, items 1–3 illustrate the situation in which the gear selector is in neutral or forward gears 1–4. In this situation, if the PTO is on, the engine will be prevented from running if neither the right forward presence lever 202, the left forward presence lever 201 nor the reverse presence lever 203 are in the ON position. Item 2 indicates that if one of the three presence levers is ON, then the motor or engine will not be prevented from running. Item 3 indicates that if the PTO is OFF and neutral or a forward gear is selected, then the position of the presence lever does not matter and the engine is not prevented from running.

Items 4–9 indicate the situation in which the lawn mower is in reverse gear. As can be seen in items 4–9, whether the PTO is ON or OFF, the only condition which will allow the motor to be ON is when the reverse presence lever 203 is also in the ON state.

Parking Brake

The disclosed mower includes a parking brake assembly identified generally by reference numeral 300 and described with particular reference to FIGS. 9, 11, 12 and 13 of the drawings. The parking brake apparatus for the respective drive wheels 36 and 38, includes the drive levers 108, 110, which operate to constrict the brake bands 138 about the hubs of the respective drive wheels through activation of brake levers 134 by the respective drive levers and connecting links 135 which rigidly connect the brake levers to the drive levers.

The parking brake assembly 300 includes an operating shaft 302 which extends laterally across the rear of the bed 16 of the power deck 12, with the opposite ends of the shaft being mounted for rotation in openings 146 formed in the side flanges 20 of the bed plate 18. A pedal arm 304 having a foot pedal 306 attached at its free end is fixedly secured to the operating shaft 302, whereby the operating shaft is caused, when activated, to rotate in a counter-clockwise direction, as viewed from the right hand end in FIG. 12.

Figure 13:
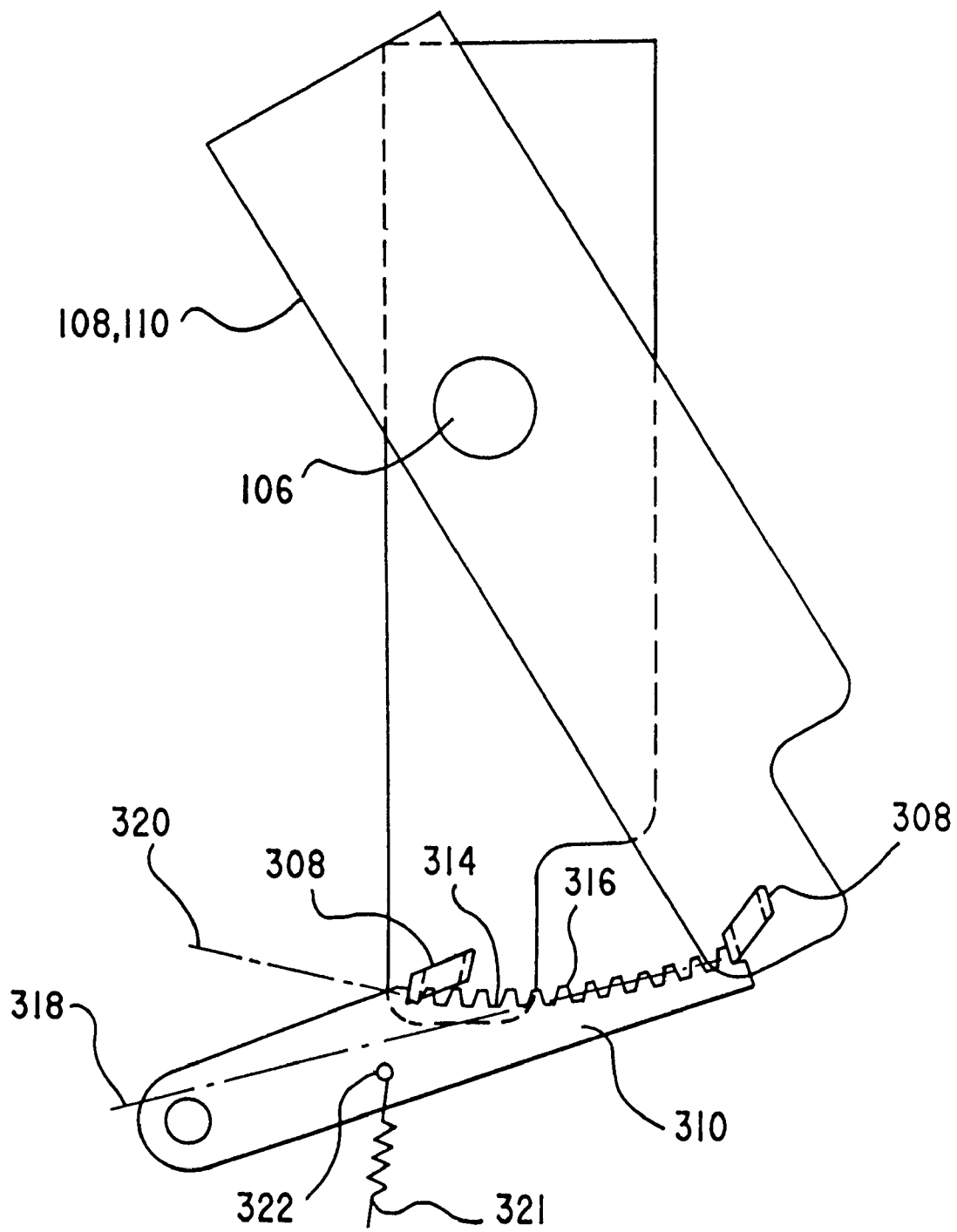
FIG. 13 is a schematic view illustrating parking brake operator elements in various positions.

As shown in the drawing figures, each drive lever 108, 110 has a pawl 308 in the form of an inclined U-shaped projection extending from a side surface of a depending leg of the drive lever. The operating shaft 302 contains a pair of locking fingers 310 and 312, each of which contains an upwardly facing side edge 314 having an arcuately formed portion adjacent the free end and having locking teeth 316 thereon adapted to engage the pawls 308. In order to facilitate engagement of the pawls 308 on the drive levers 108, 110 with the locking teeth 316 on the locking fingers 310, 312, the free ends of the teeth are arcuately formed. Also, as shown in FIG. 13 which illustrates a drive lever 108, 110 in both of its extreme positions of engagement with the locking levers, the inclination of the pawls 308 and the disposition of the teeth 316 along the locking finger edge 314 is such as to ensure a full surface engagement of the pawl with the teeth wherein the engagement force vectors are substantially normal to the engaging surface on the pawl, as indicated by direction lines 318 and 320.

According to the invention, the locking finger 310 is fixed, as by means of welding, to the operating shaft 302 so as to rotate with the shaft. A return spring 321, which is connected at one end to a hole 322 in the locking finger 310 and whose other end is fixed with respect to the bed 16, biases the locking finger 310, and consequently the shaft 302, in a direction away from the drive levers. This bias is overcome when the foot pedal 306 is depressed.

Locking finger 312 is connected to the operating shaft 302 in a manner as to permit a restricted amount of relative movement with respect to the shaft in order to provide a lost motion function between the locking finger and the shaft. As shown, the locking finger 312 has a clearance hole 324 through which the operating shaft 302 loosely passes. A pair of radially extending pins 326 and 328 are fixed to the shaft at axially spaced locations therealong. Pin 326 is positioned closely adjacent the right side of locking finger 312, as viewed in FIG. 12, and pin 328 is located at a position remote from the left side of the locking finger. A torsion spring 330 surrounds the operating shaft 302 between the left side of locking finger 312 and the radial pin 328. A tang 332 on the right end of the torsion spring 330 attaches the locking finger 312 via a connecting hole 334 therein. The left end of the torsion spring 330 contains an arm (not shown) which bears against radial pin 328. During assembly of the torsion spring onto the shaft, the spring is pre-loaded in a tightening direction so as to bias the movable locking finger 312 upwardly toward the adjacent pawl 308, with such upward movement being limited by engagement of the tang 332 with the radial pin 326.

Figure 12:
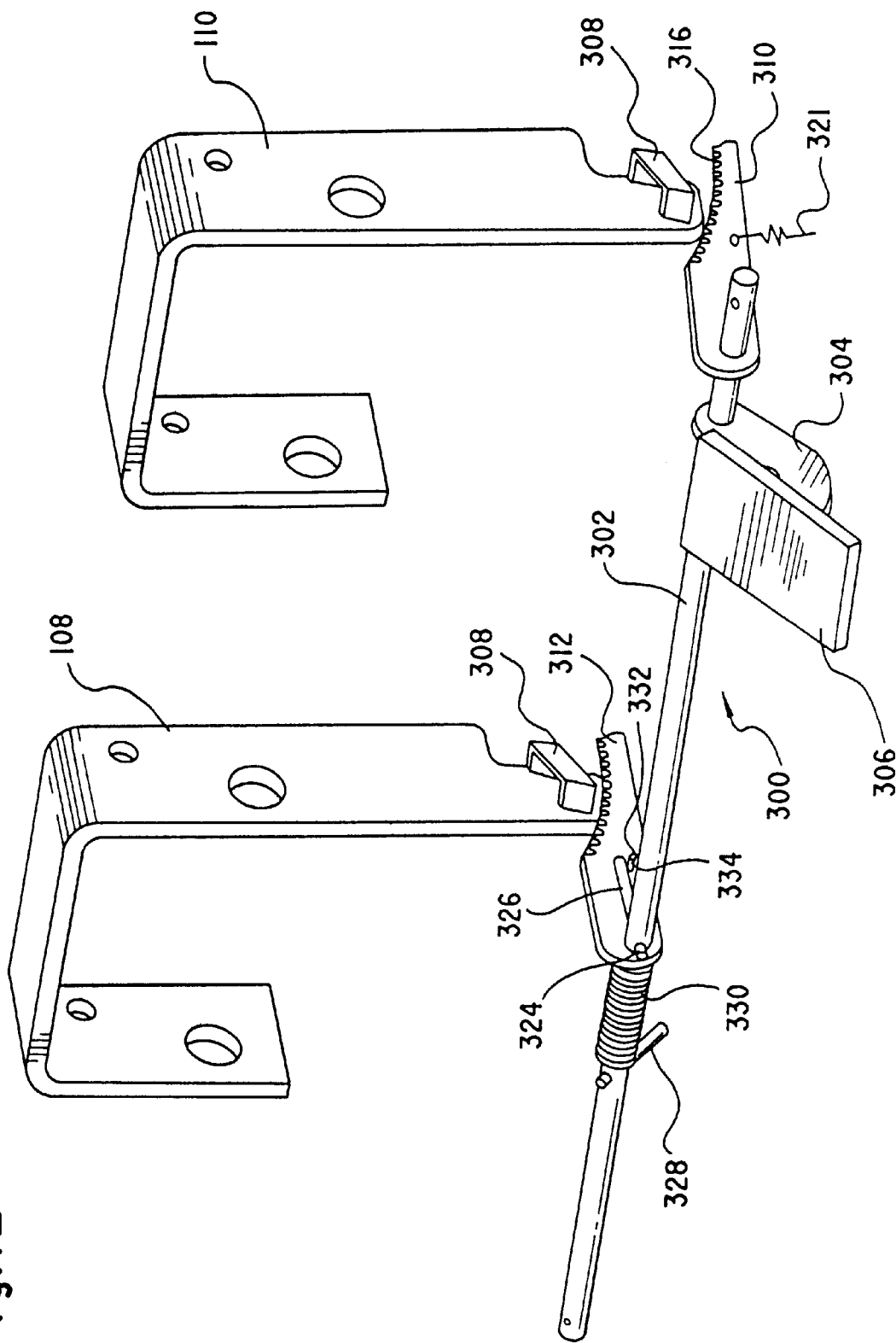
FIG. 12 is a perspective view of the parking brake operator elements of the present invention.

As is evident from consideration of FIG. 12, the locking fingers 310 and 312 are not angularly aligned about the operating shaft 302. Instead, the movable finger 312 is displaced angularly upwardly with respect to the fixed finger 310 so as to engage the pawl 308 on drive lever 108 prior to engagement by the fixed finger 310 with the pawl 308 on drive lever 110. As a result of this construction, depression of the foot pedal 306 by the machine operator causes, first, the teeth 316 on the movable locking finger 312 to engage the pawl 308 on the drive lever 108 in order to lock the drive lever, and concomitantly, the associated brake lever 134 in their counter-clockwise positions to hold the brake band 138 constricted about the brake drum 144 of the left drive wheel. Immediately, thereafter, the fixed locking finger 310 is brought into engagement with the pawl 308 on drive lever 110 so as to secure the drive lever in its braked condition, limited continued rotation of the operating shaft 302 being permitted due to the lost motion function effected by the coupling of locking finger 312 to the operating shaft 302 through the torsion spring 318.

The operation of the described parking brake assembly 300 is as follows. When the drive control handles 114 and 116 that connect with drive levers 108 and 110, respectively, are pulled backward by the machine operator, the brake bands 138 constrict brake pads 142 about the brake drums 144 to apply a braking force to the respective drive wheels 36, 38. The residual forces developed in the brake bands 138 bias the control handles 114 and 116 to a neutral position on the handle bar 56, which position is intermediate their "drive" position and their "brake" position. Coincident with this, drive levers 108, 110 and their associated brake levers 134 tend to move in a counterclockwise direction as viewed in FIG. 11.

The parking brake function is initiated by the machine operator depressing the foot pedal 306 with the wheel brakes being manually applied and the control handles 114, 116 being held by the operator in their "brake on" or rearward position. Consequently, operating shaft 302 is rotated counter-clockwise to move the locking fingers 310, 312 toward the pawls 308 on the respective drive levers 108, 110 whereupon locking teeth 316 on the movable locking finger 312, which is upwardly biased out of alignment with fixed locking finger 310, are caused to engage the pawl 308 on the drive lever 110. With the torsion spring 330 providing a lost motion coupling between the movable locking finger 312 and the operating shaft 302, the shaft continues to rotate until the locking teeth 316 on the locking finger 310 engage the pawl 308 on drive lever 110.

A force perpendicular to the end face of the pawl 308 results when the teeth 316 engage the pawl 308. This force is the result of the inclination of the pawl 308 and the bias on the drive lever 108, 110 to rotate clockwise. The direction of this force is represented in FIG. 13 by lines 318 and 320 for the two positions illustrated.

The force generated between the teeth 316 and the pawls 308 is directed over the pivot (i.e., the center of the operating shaft 302) of the locking fingers 310 and 312. This force tends to rotate the locking fingers 310 and 312 upwardly (counterclockwise). However, the pawls 308, which are attached to the drive levers 108 and 110, tend to rotate clockwise to the "neutral" position of the drive levers 108 and 110. Thus each engaged member has a force applied to it that biases each member further into engagement.

This perpendicular force creates a frictional force between the engaged tooth 316 and the pawl 308. The frictional force is perpendicular to the force along line 318 or 320. The frictional force counteracts the force of the return spring 321 attached to the locking finger 310. The interaction of the perpendicular force, the friction force and the return spring force creates a self-locking relationship between the pawls 308 and the locking fingers 310 and 312. Therefore, the parking brake assembly remains engaged.

For releasing the parking brake, the machine operator pulls the control handles 113, 116 rearwardly. Such action causes movement of the drive levers 108, 110 in a clockwise direction which results in the pawls 308 being removed from engagement with the locking teeth 316. When this occurs, the force resisting the return spring 321 is removed and the fixed locking finger 310 falls away from its associated pawl 308 thereby moving with it the operating shaft 302 and the movable locking finger 312 whereupon the parking brake becomes fully disengaged.

From the foregoing, it is evident that the described parking brake organization is of simple, inexpensive construction, yet is effective for its intended purpose and, moreover, as compared with comparable devices of the prior art, permits location of the parking actuator in an uncongested, easily accessible location on the mower.

Blade Brake Assembly

Figure 17:
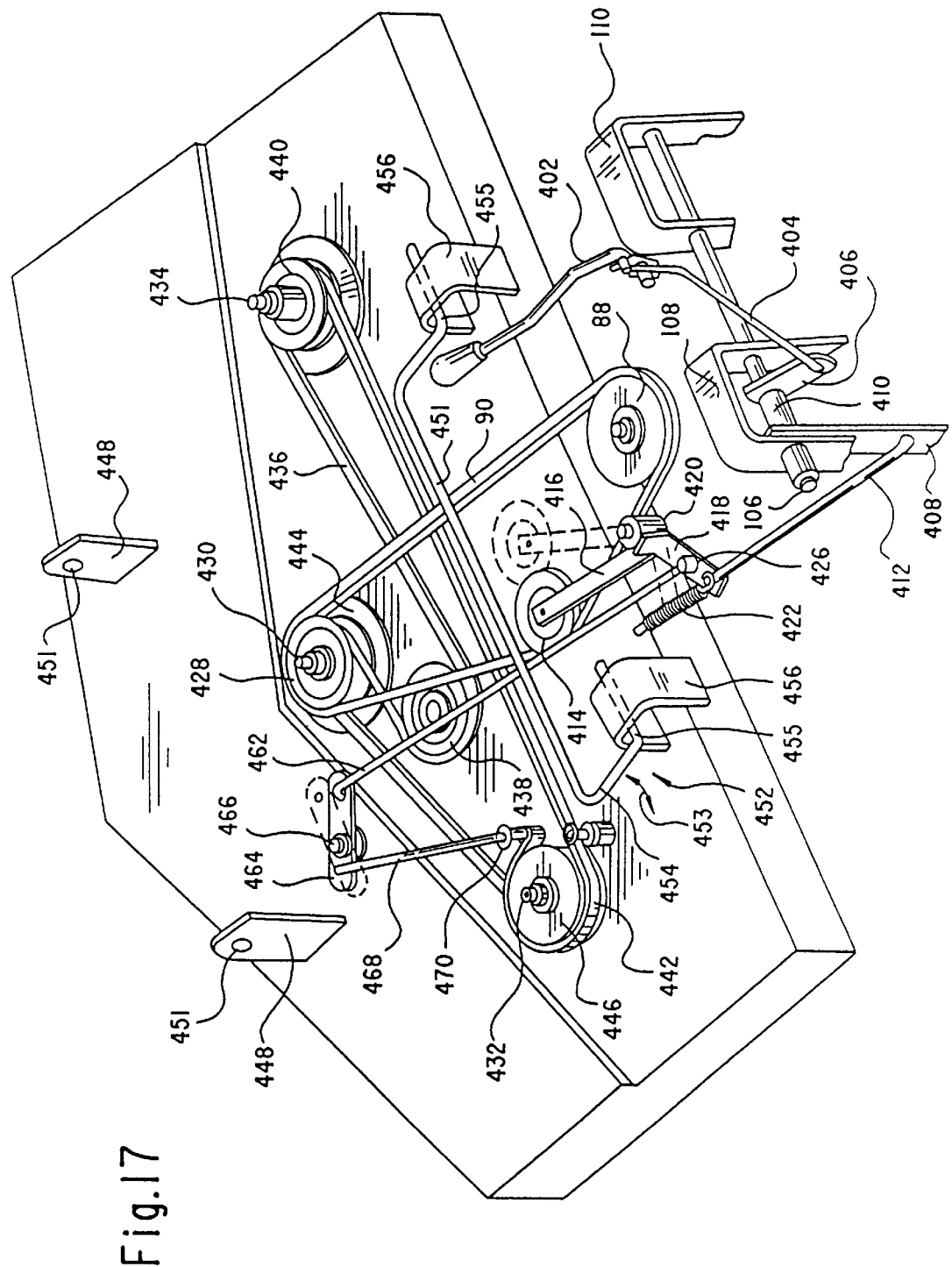
FIG. 17 is a partial perspective view of the blade brake and operating elements thereof for the lawn mower of the present invention.

The blade brake assembly in accordance to the instant invention is operated when the power take-off unit is disengaged. Specifically (as seen in FIG. 17), the power take-off unit includes a power take-off (PTO) drive pulley 88 driven by the motor, and PTO drive belt 90 driven by the PTO drive pulley 88. Mower deck drive pulley 428 is engaged with PTO drive belt 90 and is driven by it. Mower deck drive pulley 428 is attached to and co-axial with shaft 430 which drives the center mower blade. A mower deck drive belt 436 is threaded around center mower deck pulley 444, immediately beneath mower deck drive pulley 428 and also supported on shaft 430. The mower deck drive belt 436 is also threaded around right side mower deck pulley 440, which is supported on shaft 434 which also support the right side mower blade. The mower deck drive belt 436 is furthermore threaded around left side mower deck pulley 442 which is disposed immediately beneath the blade brake assembly 446 and is supported on left side shaft 432 which also supports the left side mower blade. A mower deck tension pulley 438 provides proper tension on mower deck drive belt 436 for driving all three mower blades. PTO idler pulley 414 is inserted in contact with PTO drive belt 90 between PTO drive pulley 88 and mower deck drive pulley 428. When PTO idler pulley 414 is engaged with PTO drive belt 90 and is biased outwardly, the power take-off unit is engaged and the mower deck drive pulley 428 is driven.

When PTO idler pulley 414 is shifted inwardly (as shown in phantom) so that it no longer applies tension on PTO drive belt 90, the power take-off unit is disengaged. In other words, mower deck drive pulley 428 is not driven.

PTO idler pulley 414 is shifted inwardly to disengage the PTO unit. PTO idler pulley 414 is shifted inward in response to PTO control lever 402, as best seen in FIGS. 6 and 17. PTO control lever 402 is connected by way of upper rod 404 to first arm 406. First arm 406 is fixed with respect to second arm 408 by way of collar 410. Collar 410 is supported by and rotates around shaft 106. Second arm 408 is connected by way of lower rod 412 to a lower mounting fitting 427. Furthermore, a damping spring 422 is provided on a remote end of lower rod 412, on the opposite of lower mounting fitting 427 from second arm 408. An idler pivot 420 fixed to the power deck includes first PTO idler arm 416 and second PTO idler arm 418. First PTO idler arm 416 extends outwardly from idler pivot 420 and rotatably supports PTO idler pulley 414. Second PTO idler arm 418 extends outwardly from idler pivot 420 and provides a mounting surface for lower mounting fitting 427 which provides for a pivotal connection with rod 412. An upper mounting fitting 426 is provided on the upper portion of second PTO idler arm 418. In response to the movement of rod 412, second PTO idler arm 418, and in turn first PTO idler arm 416 pivots about idler pivot 420, thus causing PTO idler pulley 414 to move inwardly (as shown in phantom) and outwardly with respect to the PTO drive belt 90. Belt guide 424 is simply provided to prevent PTO drive belt 90 from slipping off of PTO idler pulley 414 as it releases its tension and moves inwardly with respect to the belt. Thus, when PTO idler pulley 414 is shifted inwardly, the PTO unit is disengaged.

As illustrated in FIG. 3, the lawn mower having a blade braking system in accordance with the instant invention is adjustable for different cutting heights. Specifically, as seen in FIG. 3, the mower deck 14 is illustrated in its high position. It is also illustrated in its low position 15, as indicated in phantom. The lawn mower is supported on the ground by drive wheels 36, 38 in the rear and by caster wheels 42, 44 in the front. Support arms 40 are fixed with respect to the power deck 12. At the forward end of support arms 40, the caster wheels 42, 44 are supported. A support shaft housing 460 is fixed to the forward end of each support arm 40, and supports a caster support shaft 458 therein. Support housing 460 is adjustable up and down along the length of caster support shaft 458, in order to raise and lower support arms 40 with respect to the caster wheel and the ground. Preferably, spacers 480 (see FIG. 2) may be inserted or removed from below each support shaft housing 460 in order to raise or lower it with respect to the associated caster wheel. Mower deck 14 is mounted to support arm 40 by way of a pair of brackets 448 (FIG. 17) which are supported on support arm 40 by way of pivot pin 450 (FIG. 3) being inserted in opening 451 of bracket 448 (FIG. 17). While the left side is being described, it should be noted that the right side is similar.

As illustrated in FIGS. 3 and 17, a height adjusting mechanism is generally indicated by the arrow 452 and includes a pivot bar 454 which pivots (through angle 453) with respect to support arms 40 and has an inwardly extending engaging end 455. Pivot bar 454 pivots about a pivot portion 451 (see FIG. 17). The engaging end 455 supports bracket 456 which is fixed to the top of the lawn mower deck. As seen in FIGS. 2 and 3, a deck height lever 482 is fixed to a forward end of pivot bar 454. Deck height lever extends upwardly with a remote end easily grasped by an operator. A notched adjustment track 484 is in interlocking engagement with deck height lever 482, wherein deck height lever 482 is incrementally shiftable with respect to notched adjustment track 484 into one of a number of predetermined positions indicated by a notch in notched adjustment track 484. Each predetermined position represents a different cutting height. Since deck height lever 482 is fixed to pivot bar 454, as deck height lever 482 is pivoted, pivot bar 54 pivots or rotates (through angle 453) with respect to support arm 40, and inwardly engaging ends 455 shift downwardly with respect to support arm 40. Since engaging ends 455 support brackets 456 and thus mower deck 14, as engaging ends 455 shift downwardly, so do brackets 456 and accordingly mower deck 14. However, mower deck 14 is pivoted at pivot pin 450 (FIG. 3). Thus, the mower deck pivots downwardly and does not remain level with respect to the ground. This causes two concerns. The first concern is maintaining the mower deck and the mower blade in a position substantially parallel to the ground. This is accomplished by adjusting the height of support shaft housing 460 with respect to caster support 458. Therefore, when the mower deck 14 is adjusting downwardly or upwardly by the height adjusting mechanism 452, the support shaft housings 460 are also adjusted to compensate.

A second concern arising from the pivoting deck is the proper connection of a linkage to the blade brake for braking the mower blades when the PTO unit is disengaged. This solution will be described below.

Figure 18:
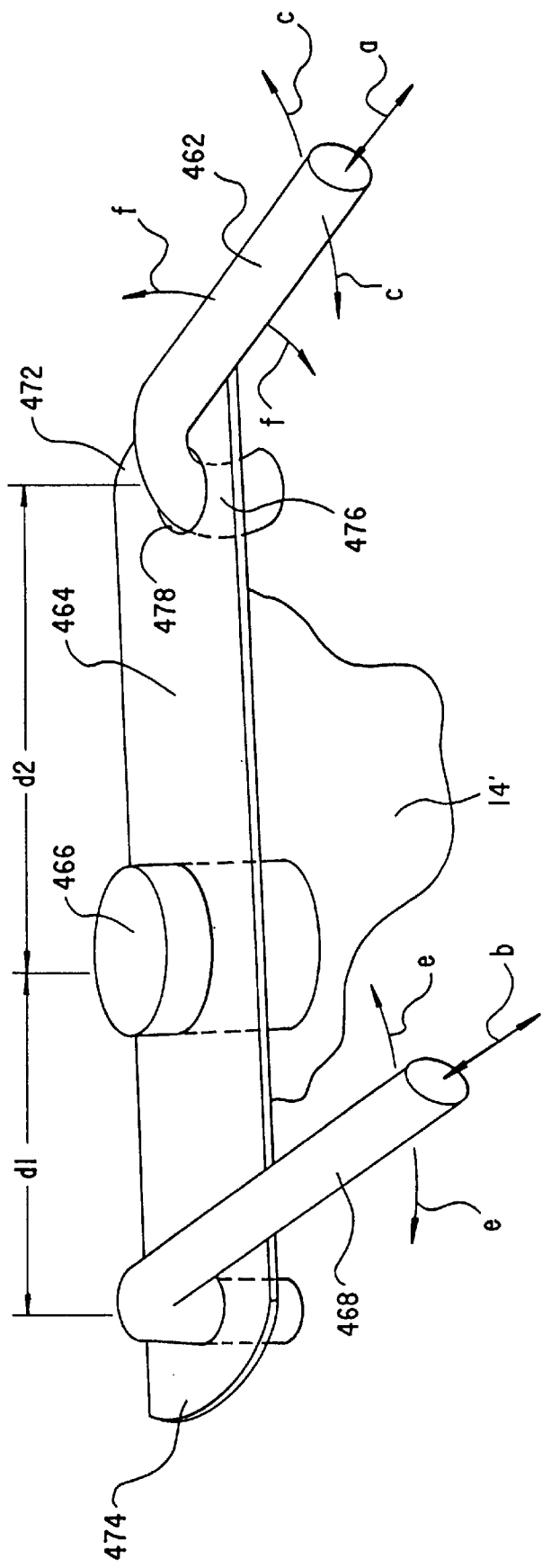
FIG. 18 is a more detailed partial perspective view of the blade brake and operating elements thereof shown in FIG. 16.

When the PTO is disengaged, then ANSI regulations require the blades to stop moving within specified amount of time. Thus the blade brake should be applied when the lawn mower is shifted into the PTO disengaged state. Accordingly, as illustrated in FIG. 17, actuating rod 462 is connected to second PTO idler arm 418 by way of pivotable upper mounting fitting 426. Actuating rod 462 extends forwardly from second PTO idler arm 418 to pivot lever 464. Pivot lever 464 pivots about a center pivot 466 which is fixed to mower deck 14 (illustrated as 14' in FIG. 18). Pivot lever 464 (as seen in FIGS. 17 and 18) transfers the longitudinal reciprocating movement of actuating rod 462 indicated by arrow a into the longitudinal reciprocating movement of link member 468 indicated by arrow b. Center pivot 466 and pivot lever 464 are fixed to the mower deck at a point near the mower deck pivot pin 450 which pivots in openings 451 of brackets 448. As noted in FIG. 18, the forward end of actuating rod 462 has a connecting end 476 extending generally perpendicular to the actuating rod 462. Connecting end 476 is inserted into an oversize hole 478 such that actuating rod 462 is pivotable in two different angular directions with respect to pivot lever 464. Actuating rod 462 pivots in a direction generally parallel to the plane of the pivot lever 462 as indicated by arrow c. Furthermore, because of the oversize hole 478 and the connecting end 476 of actuating rod 462, actuating rod 462 is also pivotable in a direction not parallel to the plane of pivot lever 464. In fact, actuating rod 462 is pivotable in a direction generally perpendicular to the plane of pivot lever 464 as indicated by arrow f. Link member 468 extends from a pivotal connection with a second end 474 of pivot lever 464 to connect with band brake 446. A support ring 470 (FIG. 17) is fixed to the mower deck to support an end of link member 468 nearest the band brake. As link member 468 shifts toward the band brake, the band brake is applied, braking the left mower blade and the other mower blades by way of mower deck drive belt 436. As illustrated in FIG. 18, it is preferable that the distance between the center pivot 466 and the connection of pivot lever 464 with actuating rod 462 indicated by d2 is greater than the distance from center pivot 466 to the connection between pivot lever 464 and link member 468 (indicated by d1). Since the pivot lever 464 is located near pivot pin 450 of the mower deck, the pivotability of actuating rod 462 in two different angular directions compensates for the pivoting of the mower deck when raising and lowering the height adjustment. Furthermore, because actuating rod 462 is a long rod and pivoted at pivot lever 464, any large change in lateral movement of actuating rod 462 at the end nearest the power deck is reduced to a smaller amount near pivot lever 464. Furthermore, when d2 is greater than d1, any difference in longitudinal motion of actuating rod 462 (between high and low cutting levels) is accordingly reduced in the longitudinal motion of link member 468. Thus, the pivoting movement of the mower deck when changing cutting height is compensated for without requiring continued adjustment of the blade brake itself, and thus enabling the blade brake to always be in proper alignment, since it is fixed with respect to the location of center pivot 466 and pivot lever 464.

In operation, when the operator moves the PTO control lever 402 to select a disengaged state for the PTO unit, motion is transmitted through upper rod 404, first arm 406, collar 410, second arm 408, lower rod 412, through lower mounting fitting 427 to pivot second PTO idler arm 418 about idler pivot 420. When idler pivot 420 pivots in the clockwise direction, first idler arm 416 and PTO idler pulley 414, rotatably attached thereto, are pivoted in turn. As PTO idler pulley 414 is shifted inwardly, the tension on PTO drive belt 90 is removed and power to mower deck drive pulley 428 is removed. As second PTO idler arm 418 moves forwardly, so does actuating rod 462, because it is pivotally connected to second PTO idler arm by way of pivotable upper mounting fitting 426. As actuating rod 462 moves forward, pivot lever 464 pivots about center pivot 466 and causes link member 468 to be moved longitudinally toward band brake 446 and thus apply band brake 446 to thereby stop the rotation of the mower blades.

When the PTO control lever 402 is returned to the engaged state to engage the PTO unit, each of the above elements operates in the reverse way to release band brake 446 and thus to allow the mower blades to spin freely.

Ballast System

The ballast system in accordance with the instant invention can best be seen with reference to FIGS. 3–6. Ballast tank 252 is illustrated in these figures. The ballast system in accordance with the instant invention is used with a lawn mower 10 having a power deck 12 and a mowing deck 14. An engine or motor 26 is positioned on bed 16 of power deck 12 for driving left and right drive wheels 36, 38. Mower deck 14 is attached to and extends forwardly from power deck 12 and is supported at its front end by caster wheels 42, 44. A fuel tank 34 is supported on bracket 32 located at the rear portion of power deck 12. Depending arms 58, 60 extend upwardly and rearwardly from the power deck and are fixed to and supported by bracket 32. Ballast tank 252 is supported between depending arms 58, 60 of the handle bar 56. As seen most clearly in FIGS. 3 and 4, ballast tank 252 is disposed near the end of handle bar 56, remote from power deck 12. FIGS. 3 and 4 illustrate a filler cap 254 or opening the top of ballast tank 252 to fill the interior volume with the desired ballast, whether water, sand or any other appropriate ballast. Draining cap 256 allows the ballast to be easily drained out from ballast tank 252.

As clearly seen in FIG. 3, ballast tank 252, disposed near an end of handle bar 56, is located behind the center line of drive wheels 36, 38. In fact, the ballast tank 252 is disposed behind the rearmost portion of drive wheels 36, 38.

Furthermore, it should be noted that ballast tank 252 is disposed at least partially behind fuel tank 34.

In operation, the filler cap 254 may simply be removed by the operator and ballast tank 252 may be filled with water, sand or any other appropriate ballast. Cap 254 may then be replaced. The appropriate ballast in ballast tank 252 will change the center of gravity of the lawn mower itself. It will aid to counter balance the mower deck 14 attached on the front of the power deck 12. This will aid in handling the lawn mower in tight places, or under any other circumstances. Because ballast tank 252 is disposed high up on handle bar 56, in order words, near the end of handle bar 56, this arrangement increases the movement arm of any ballast in ballast tank 252, thus increasing the efficiency of any such ballast. When finished, the user may drain the ballast through drain cap 256.

It should also be noted that although the above description has been set forth with regard to the mower deck 14, the power deck 12 may also be employed with a snow blower, auxiliary unit, a power sweeper auxiliary unit or many other types of auxiliary units. As an example, the lawn mower deck may have a different weight than the snow blower auxiliary unit or the power sweeper auxiliary unit. Accordingly, because the ballast tank 252 has an interior volume that may accept varying amounts of ballast, the ballast tank 252 may be filled full, or may be partially filled to compensate for different weights of the different auxiliary units, such as the mower deck, the snow blower auxiliary unit and the power sweeper auxiliary unit.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A blade brake assembly for use with a lawn mower, having a power deck with a pair of wheels and a mower deck supporting at least a mower blade driven by the power deck, wherein the power deck includes a support structure extending forwardly therefrom to support a pair of caster wheels, and wherein said mower deck is suspended at a front thereof from the support structure by way of pivot pins, and is suspended at the rear thereof by a height adjusting mechanism, such that the mower deck is pivotable with respect to the power deck in order to change the cutting height, said blade brake assembly comprising:
    an actuator mounted to said power deck and shiftable in response to a command by an operator;
    a band brake operatively coupled to the mower blade;
    a center pivot mounted on said mower deck and fixed with respect thereto;
    a pivot lever pivotally mounted on said center pivot and having a first end pivotally connected to an end of said actuator; and
    a link member pivotally connected at one end thereof to a second end of said pivot lever, opposite said first end, wherein said center pivot is intermediate said two ends of said pivot lever, said link member being connected at a second end thereof to said band brake, wherein said center pivot and pivot lever are disposed proximal to the pivot pins supporting the front of the mower deck.

2. The blade brake assembly of claim 1, wherein said first end of said pivot lever is pivotally connected to the end of said actuator such that said actuator is pivotable in two different angular directions with respect to said pivot lever.

3. The blade brake assembly of claim 2, wherein said actuator is elongated and has a connecting end, extending from said end thereof and extending generally perpendicular to the length of the actuator, and
    wherein said pivot lever presents an opening therein, having a size sufficiently larger than the thickness of said connecting end and accepting said connecting end therein, such that said actuator is pivotable in a first direction, substantially parallel to a pivot plane of said pivot lever, and pivotable in a second direction in a plane not parallel to said pivot plane.

4. The blade brake assembly of claim 3, wherein said second direction is a plane substantially perpendicular to said pivot plane.

5. The blade brake assembly of claim 4, wherein the distance from said center pivot of said pivot lever to the pivot with said actuator is greater than the distance from the center pivot of said pivot lever to the pivot with said link member.

6. The blade brake assembly of claim 5, wherein said actuator is an elongated rod.

7. A lawn mower with a blade brake assembly, comprising:
    a power deck having a motor supplying power to at least one drive wheel;
    two caster wheels forward of said power deck and connected thereto by structural members;
    a mower deck, supporting at least one cutting blade with a band brake operatively connected thereto, wherein said mower deck is supported from a front portion thereof by a mower deck pivot attached to said structural members, and from a rear portion thereof by a height adjusting mechanism;
    an actuating rod mounted to said power deck and shiftable in response to a command by an operator;
    a pivot lever, pivotally mounted on a center pivot fixed with respect to said mower deck, a first end of said pivot lever pivotally connected to said actuating rod, wherein said pivot lever has a second end, remote from said first end, such that said center pivot is intermediate said first and second ends, and further wherein said center pivot and pivot lever are located on said mower deck, near said mower deck pivot; and
    a link member pivotally connected to said second end of said pivot lever, wherein an end of said link member, remote from said pivot lever, engages said band brake for operating said band brake, in response to movement of said link member.

8. The lawn mower of claim 7, wherein said first end of said pivot lever and said actuating rod are pivotally connected, such that said actuating rod is pivotable with respect to said pivot lever in two different angular directions, the first direction being substantially parallel to a pivot plane of said pivot lever, and the second direction being in a plane not parallel to said pivot plane.

9. The lawn mower of claim 8, wherein said second direction is in a plane substantially perpendicular to said pivot lever.

10. The lawn mower of claim 8, wherein said pivot lever has a opening therein on said first end, and where said actuating rod has a connecting end, substantially perpendicular to the length of said actuating rod, such that said connecting end is engageable with said opening, wherein said opening is larger than the thickness of said connecting ends, to provide pivoting motion between said actuating rod and said pivot lever in said two directions.

11. The lawn mower of claim 8, wherein a distance from said center pivot to said actuating rod is greater than a distance from said center pivot to said link member.

12. The lawn mower of claim 11, further comprising a power take off belt, connecting to said power deck and to said mower deck to drive said cutting blade.

13. The lawn mower of claim 12, further comprising an idler pulley engaged with said belt to drive said mower blade, wherein, when a power take off lever, operatively connected to said idler pulley, is shifted, by an operator, into a disengage state, said idler pulley releases tension on said belt, removing power drive from said mower blade.

14. The lawn mower of claim 13, wherein said actuating rod is linked to said power take off lever, such that when said power take off lever is shifted to a disengaged state, said actuating rod is shifted in order to activate said band brake to stop the mower blade from spinning.

15. A blade brake assembly for use with a lawn mower having a power deck with a pair of wheels and a mower deck supporting at least a mower blade, driven by the power deck, wherein the mower deck is pivotable with respect to the power deck, said blade brake assembly comprising:

an actuator mounted to said power deck and shiftable in response to a command by an operator;

a band brake operatively coupled to said mower blade;

a center pivot mounted on said mower deck and fixed with respect thereto;

a pivot lever pivotally mounted on said pivot and having a first end pivotally connected to an end of said actuator; and a link member pivotally connected at one end thereof to a second end of said pivot lever, opposite said first end, wherein said center pivot is intermediate said two ends of said pivot lever, said link member being connected at a second end to said band brake, wherein the power deck includes a support structure extending forwardly therefrom to support a pair of caster wheels, and wherein said mower deck is suspended at a front thereof from the support structure by way of pivot pins, wherein said center pivot and pivot lever are disposed proximal to the pivot pins supporting the front of the mower deck.

16. The blade brake assembly of claim 15, wherein said first end of said pivot lever is pivotally connected to the end of said actuator such that said actuator is pivotable in two different angular directions with respect to said pivot lever.

17. The blade brake assembly of claim 16, wherein said actuator has a connecting end, extending from said end thereof and extending generally perpendicular to the length of the actuator, and wherein said pivot lever presents an opening therein, having a size larger than the thickness of said connecting end and accepting said connecting end therein, such that said actuator is pivotable in a first direction, substantially parallel to a pivot plane of the pivot lever, and pivotable in a second direction in a plane not parallel to said pivot plane.

18. The blade brake assembly of claim 17, wherein said second direction is in a plane substantially perpendicular to said pivot plane.

19. The blade brake assembly of claim 18, wherein the distance from the central pivot of said pivot lever to the pivot with said actuator is greater than the distance from the central pivot of said pivot lever to the pivot with said link member.

20. The blade brake assembly of claim 19, wherein said actuator is an elongated rod.

* * * * *